US012592749B2

(12) United States Patent　　　(10) Patent No.:　US 12,592,749 B2

Matsumura et al.　　　(45) Date of Patent:　Mar. 31, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Naoya Shibaike, Tokyo (JP); Haruhi Echigo, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 344 days.

(21) Appl. No.: 18/270,794

(22) PCT Filed: Jan. 8, 2021

(86) PCT No.: PCT/JP2021/000569

§ 371 (c)(1),
(2) Date: Jul. 3, 2023

(87) PCT Pub. No.: WO2022/149282

PCT Pub. Date: Jul. 14, 2022

(65) Prior Publication Data

US 2024/0056131 A1　　Feb. 15, 2024

(51) Int. Cl.
*H04W 4/70*　　(2018.01)
*H04B 7/024*　　(2017.01)
(Continued)

(52) U.S. Cl.
CPC ........... *H04B 7/0404* (2013.01); *H04B 7/024* (2013.01); *H04W 72/1268* (2013.01)

(58) Field of Classification Search
CPC ..... H04B 7/0404; H04B 7/024; H04L 5/0023; H04L 5/0035; H04L 5/0044; H04W 4/70;
(Continued)

(56) References Cited

U.S. PATENT DOCUMENTS

| 12,302,311 B2 * | 5/2025 | Jung ..................... H04B 7/024 |
| 2007/0280333 A1 | 12/2007 | Abou Rjeily |

(Continued)

FOREIGN PATENT DOCUMENTS

| JP | 2007-329928 A | 12/2007 |
| JP | 2009-188551 A | 8/2009 |

OTHER PUBLICATIONS

R1-2005291, 3GPP TSG RAN WG1 #102-e :e-Meeting, Aug. 17-28, 2020, Agenda Item:8.1.5 Source: Futurewei (Year: 2020).*
(Continued)

*Primary Examiner* — Christopher M Crutchfield
*Assistant Examiner* — Syed Ahmed
(74) *Attorney, Agent, or Firm* — Osha Bergman Watanabe & Burton LLP

(57)　　　　　ABSTRACT

A terminal according to an aspect of the present disclosure includes: a receiving section that receives information related to schedule; a transmitting section that transmits, to another terminal, information related to part of UL data, the part of the UL data being obtained by dividing the UL data in at least one of a unit of transport block, a unit of codeword, a unit of code block, and a unit of bit; and a control section that performs control to transmit the UL data in cooperation with the another terminal, based on the information related to the schedule.

6 Claims, 28 Drawing Sheets

(51) Int. Cl.
  *H04B 7/0404*        (2017.01)
  *H04W 72/1268*       (2023.01)
(58) Field of Classification Search
  CPC .. H04W 72/1268; H04W 72/20; H04W 92/18
  USPC ........................................................ 370/329
  See application file for complete search history.

(56) References Cited

U.S. PATENT DOCUMENTS

| | | | | |
|---|---|---|---|---|
| 2009/0196332 | A1 | 8/2009 | Miyatani | |
| 2013/0272174 | A1 | 10/2013 | Park et al. | |
| 2017/0318615 | A1* | 11/2017 | Ou | H04B 7/026 |
| 2017/0366377 | A1* | 12/2017 | Papasakellariou | H04L 5/005 |
| 2019/0020381 | A1* | 1/2019 | Tooher | H04W 88/04 |
| 2020/0336178 | A1* | 10/2020 | Ma | H04B 7/0452 |
| 2020/0337024 | A1* | 10/2020 | Tang | H04L 5/0048 |

OTHER PUBLICATIONS

International Search Report issued in PCT/JP2021/000569 on Jul. 13, 2021 (2 pages).
Written Opinion of the International Searching Authority issued in PCT/JP2021/000569 on Jul. 13, 2021 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Japanese Application No. 2022-573894, mailed Mar. 11, 2025 (8 pages).
Office Action issued in European Patent Application No. 21917508. 0, mailed on Jun. 26, 2025 (4 pages).
Extended European Search Report issued in counterpart European Patent Application No. 21917508.0, mailed on Sep. 4, 2024 (7 pages).

* cited by examiner

| TPMI | TPMI INDEX (UE#1) | TPMI INDEX (UE#1) |
|---|---|---|
| 000 | 0 | 0 |
| 001 | 1 | 0 |
| ... | ... | ... |
| 111 | 7 | 3 |

FOR UE #1    FOR UE #2

... | TPMI1 | TPMI2 | ...

→ DCI FIELD

FOR UE #1 AND UE #2

... | TPMI | ...

→ DCI FIELD

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+(plus)," "6th generation mobile communication system (6G)," "New Radio (NR)," "3GPP Rel. 15 (or later versions)," and so on) are also under study.

In existing systems (for example, LTE systems), MIMO (Multi Input Multi Output) systems are supported as a radio communication technique for transmitting and/or receiving data by using a plurality of antennas to improve a data rate (frequency efficiency). In such MIMO systems, a plurality of transmitting/receiving antennas are prepared in a transmitting/receiving apparatus, and different transmission information sequences are transmitted from different transmitting antennas simultaneously.

For the MIMO systems, single user MIMO (SU-MIMO), in which all the transmission information sequences transmitted from the different transmitting antennas simultaneously are of the same user, and multi-user MIMO (MU-MIMO (Multiple User MIMO)), in which the transmission information sequences are of different users, are defined.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), it is studied to enhance MIMO systems to perform communication.

For example, it is assumed that UL transmission of a given terminal is performed by using antennas/antenna ports of a plurality of terminals including the given terminal (UE cooperative MIMO).

However, how to control communication using antennas/antenna ports of a plurality of UEs has not been sufficiently studied.

Thus, an object of the present disclosure is to provide a terminal, a radio communication method, and a base station which can appropriately control communication even when communication is performed by using antennas/antenna ports of a plurality of UEs.

Solution to Problem

A terminal according to an aspect of the present disclosure includes: a receiving section that receives information related to schedule; a transmitting section that transmits, to another terminal, information related to part of UL data, the part of the UL data being obtained by dividing the UL data in at least one of a unit of transport block, a unit of codeword, a unit of code block, and a unit of bit; and a control section that performs control to transmit the UL data in cooperation with said another terminal, based on the information related to the schedule.

Advantageous Effects of Invention

According to an aspect of the present disclosure, it is possible to appropriately control communication even when communication is performed by using antennas/antenna ports of a plurality of UEs.

DESCRIPTION OF EMBODIMENTS (MIMO Enhancement)

For future radio communication systems, it is studied to increase the number of antennas/antenna ports (also referred to as antenna ports below) of a terminal to improve throughput of communication. However, in a case of increasing the number of antenna ports of a UE, a distance required between antenna ports antenna ports causes the increase of the number of antenna ports to be restricted due to the size and the like of the UE.

In a case where an increase of the number of antenna ports for each UE is restricted, it is assumed to use UE cooperative MIMO (for example, UE corporative MIMO), Tx/Rx diversity, multi-user MIMO (MU-MIMO enhancement), or the like to improve throughput/cell capacity of the UE.

In a case of employing UE cooperative MIMO, it is possible, even when there is an upper limit for the number of antenna ports due to a restriction such as UE size and the like, to increase an apparent number of antenna ports by using antenna ports of a plurality of UEs. It is also defined that using antenna ports at different positions (or different antenna port numbers 9 reduces a spatial correlation. UE cooperative MIMO may be interpreted as UE collaborative MIMO, UE corporative MIMO, UE-to-UE cooperative transmission, UE-to-UE collaborative transmission, UE-to-UE cooperative reception, UE-to-UE collaborative reception, and the like.

Figures 1A, 1B:
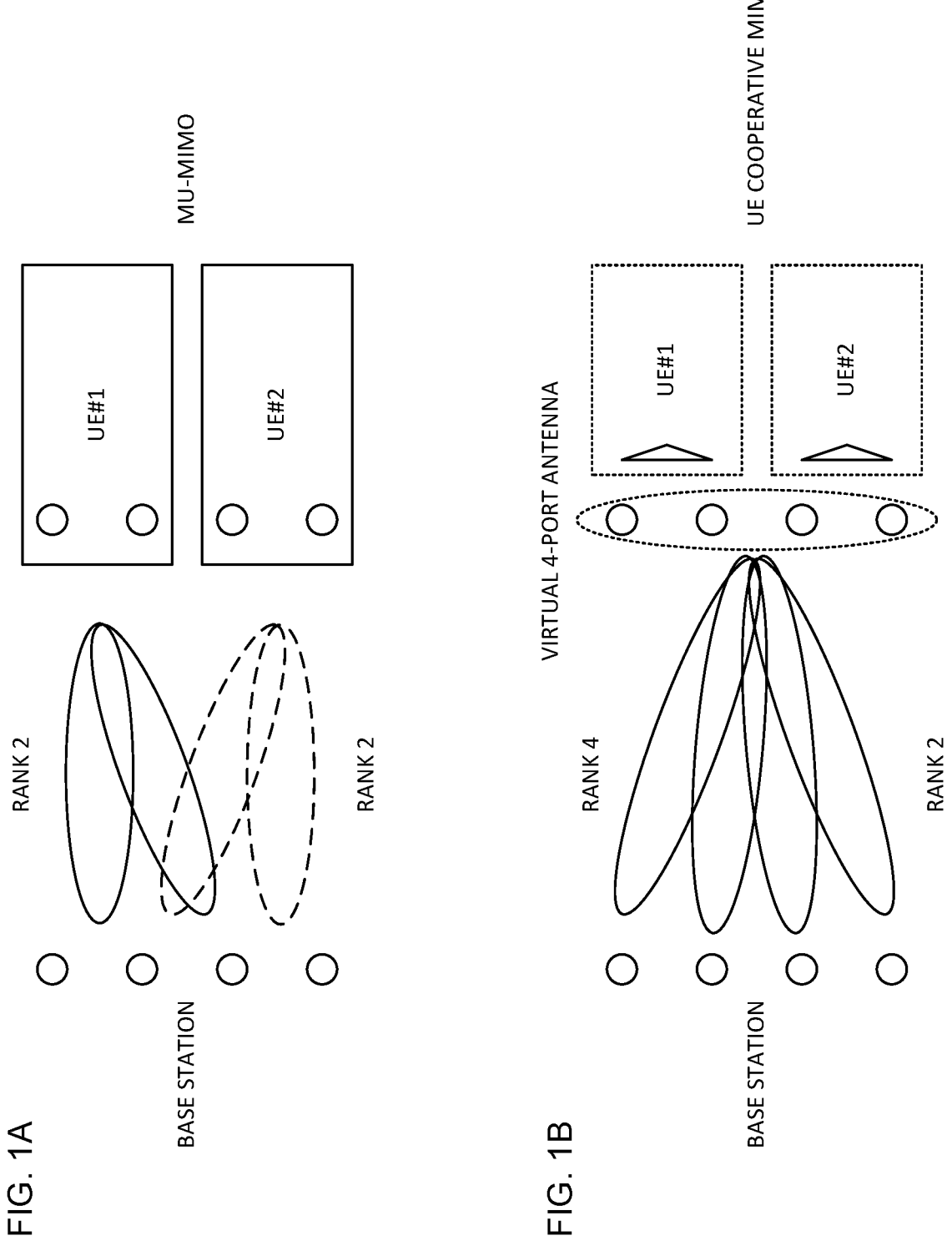
FIGS. 1A and 1B are diagrams to show examples of MU-MIMO and UE cooperative MIMO.

In a case of using four antenna ports (or four ranks/four layers) in communication between a base station and a plurality of UEs, this corresponds to rank 2 SU-MIMO being used per UE in MU-MIMO (refer to FIG. 1A). In contrast, the above case corresponds to rank 4 SU-MIMO (or a virtual four-port antenna) in UE cooperative MIMO (refer to FIG. 1B).

For example, in UE cooperative MIMO (for example, FIG. 1B), rank 4 data for UE #1 (for example, DL data/DL-SCH) may be transmitted to UE #1 and UE #2 and UE #2 then transfers data to UE #1. In this way, even when UE #1 includes only two antenna ports, UE #1 can receive data equivalent to data of four antenna ports.

Alternatively, in UE cooperative MIMO (for example, FIG. 1B), data of UE #1 (for example, UL data/UL-SCH) may be transmitted from UE #1 and UE #2. In this way, even when UE #1 includes only two antenna ports, UE #1 can transmit data equivalent to data of four antenna ports (a virtual four-port antenna).

Figure 2:
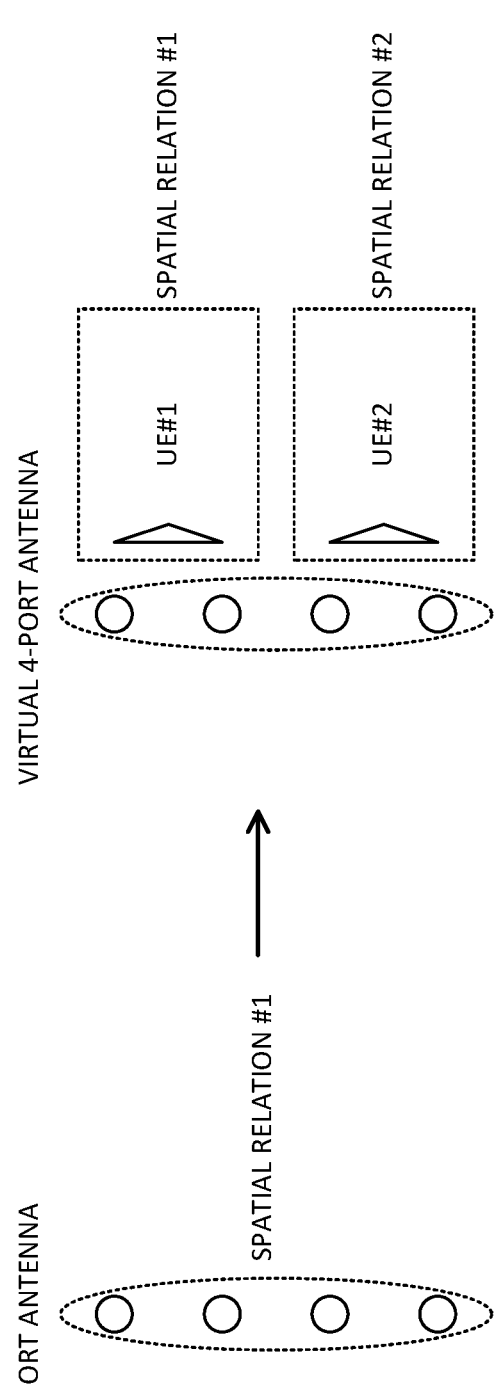
FIG. 2 is a diagram to show an example of antenna ports of UE cooperative MIMO.

As described above, it is assumed that UL transmission/DL reception of a given terminal is performed by using antennas/antenna ports of a plurality of terminals including the given terminal (UE cooperative MIMO). With this, it is possible to perform communication by using a larger number of antenna ports than the number of antenna ports supported by the given terminal (refer to FIG. 2). FIG. 2 shows an example of a case where UEs each including two antenna ports cooperate with each other to perform communication using four antenna ports (four virtual antenna ports).

However, how to control communication (for example, UL transmission processing/DL reception processing) using antenna ports of a plurality of UEs has not been sufficiently studied.

For example, how to synchronize UEs (for example, carrier frequency/phase/transmission timing) is an issue. Alternatively, how to share data/control information between UEs is an issue. Alternatively, how to control scheduling/retransmission in a case of transmission using UE cooperative MIMO is an issue. Alternatively, how to configure a beam/TCI state/spatial relation applied to (or corresponding to/related to) each antenna port is an issue. Alternatively, how to control retransmission control in a case of using UE cooperative MIMO is an issue.

In view of the above, the inventors of the present invention studied UE operation/base station operation that solves at least one of the above-described issues and came up with the idea of the present embodiments.

Embodiments according to the present disclosure will be described in detail with reference to the drawings as follows. The radio communication methods (or UE operation/base station operation) according to respective embodiments may each be employed individually, or may be employed in combination.

In the present disclosure, "A/B" and "at least one of A and B" may be interchangeably interpreted. Similarly, in the present disclosure, "A/B/C" and "at least one of A, B, and C" may be interchangeably interpreted. In the present disclosure, a cell, a serving cell, a CC, a carrier, a BWP, a DL BWP, a UL BWP, an active DL BWP, an active UL BWP, and a band may be interchangeably interpreted. In the present disclosure, an index, an ID, an indicator, and a resource ID may be interchangeably interpreted. In the present disclosure, support, control, can control, operate, and can operate may be interchangeably interpreted.

In the present disclosure, configure, activate, update, indicate, enable, specify, and select may be interchangeably interpreted.

In the present disclosure, use, determine, apply, and select may be interchangeably interpreted.

In the present disclosure, link, associate, correspond, and map may be interchangeably interpreted. In the present disclosure, allocate, assign, monitor, and map may be inter-changeably interpreted.

In the present disclosure, for example, higher layer sig-naling may be any one or combinations of Radio Resource Control (RRC) signaling, Medium Access Control (MAC) signaling, broadcast information, and the like. In the present disclosure, RRC, RRC signaling, an RRC parameter, a higher layer, a higher layer parameter, an RRC information element (IE), and an RRC message may be interchangeably interpreted.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, transmission confirmation infor-mation, HARQ-ACK, HARQ-ACK/NACK, HARQ-ACK information, HARQ, ACK/NACK, ACK, NACK, NACK only, and UCI may be interchangeably interpreted.

In the present disclosure, specific, dedicated, UE-specific, and UE-dedicated may be interchangeably interpreted.

In the present disclosure, common, shared, group-com-mon, UE-common, UE-shared may be interchangeably interpreted.

In the present disclosure, UE-dedicated DCI and DCI having CRC scrambled with a UE-dedicated RNTI may be interchangeably interpreted. The UE-dedicated RNTI may be, for example, a C-RNTI.

In the present disclosure, UE-common DCI and DCI having CRC scrambled with a UE-common RNTI may be interchangeably interpreted. The UE-common RNTI may be, for example, a multicast-RNTI.

The following description, a case where two UEs (UE #1 and UE #2) perform transmission in cooperation is described. However, the number of UEs that perform coop-erative transmission may be three or more. In the following description, a case where two antenna ports are included in each of the UEs is described. However, the number of antenna ports included in each UE is not limited to this. UE #1 and UE #2 may include the same number of antenna ports or may include different numbers of antenna ports. In the following description, a case of cooperative transmission in UL is described as an example. However, this is by no means restrictive. A similar mechanism may also be applied to a case where DL data is transmitted between a plurality of UEs in cooperation.

First Embodiment

A UE may perform such control as to synchronize UEs/antenna ports, based on a given synchronization signal.

In a case where a UE to perform UE cooperative trans-mission receives the given synchronization signal, the UE may control synchronization with another UE/synchroniza-tion with an antenna port of another UE, based on the given synchronization signal. In the present disclosure, the UE to perform UE cooperative transmission may be interpreted as a UE configured with a given higher layer parameter (for example, a parameter for UE cooperative MIMO) or a UE supporting UE cooperative transmission.

Figure 3:
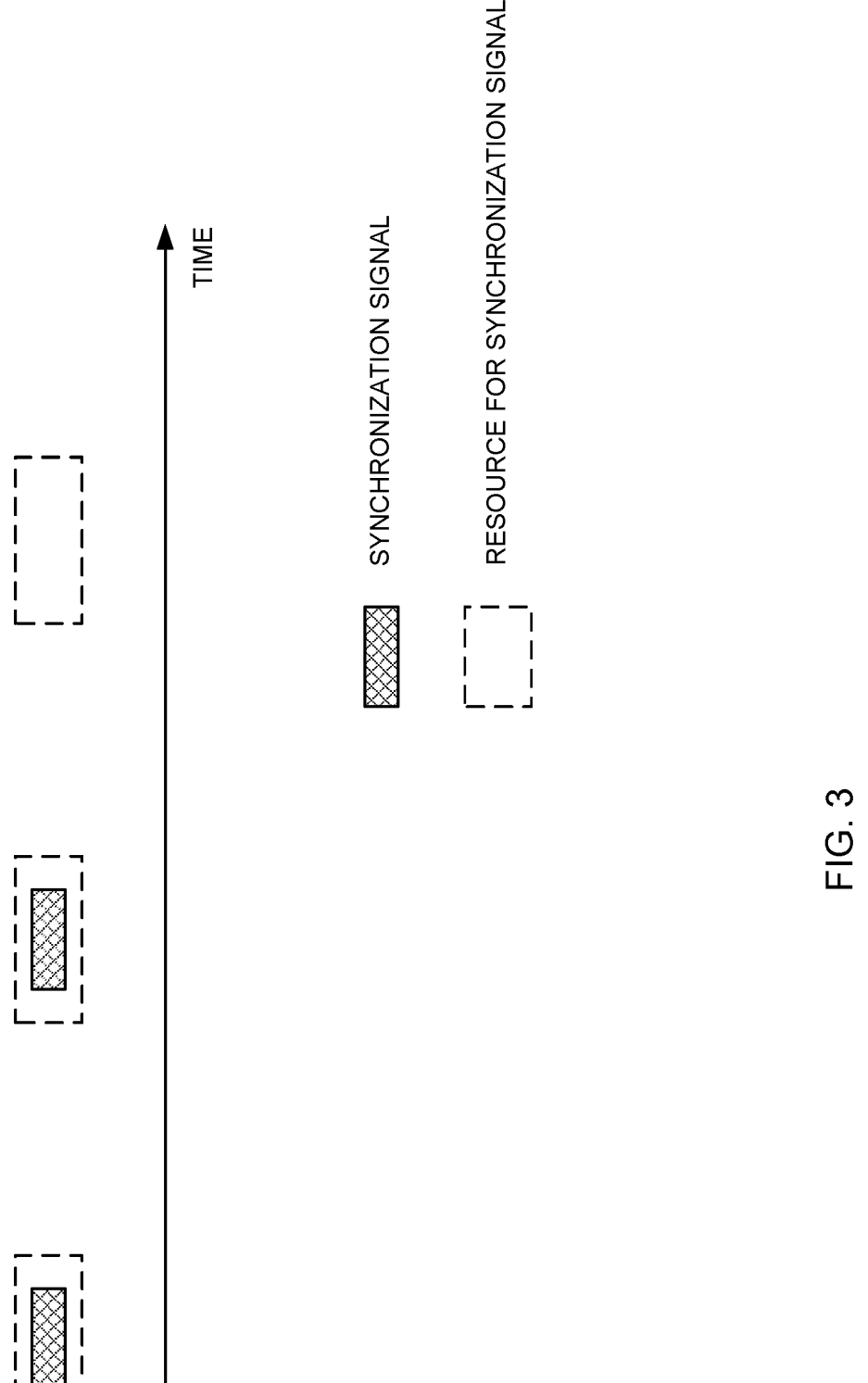
FIG. 3 is a diagram to show an example of synchronization signals in UE cooperative MIMO according to a first embodiment.

The given synchronization signal may be transmitted/configured periodically or may be transmitted/configured aperiodically. The given synchronization signal may be transmitted in a resource or an occasion (refer to FIG. 3). The resource may be interpreted as a transmission resource, a reception resource, or a measurement resource. The occa-sion may be interpreted as a transmission occasion, a recep-tion occasion, or a measurement occasion.

The resource/occasion of a synchronization signal may be notified/configured for the UE by a base station by using higher layer signaling or the like. The UE may control reception of the given synchronization signal, based on the resource/occasion notified by the base station. The given synchronization signal may be constantly transmitted in configured resources/occasions or may be transmitted in one or some resources/occasions of the configured multiple resources/occasions (or resource candidates/occasion candi-dates).

In a case of receiving a synchronization signal, the UE may perform such control as to perform synchronization (time/frequency synchronization) after the elapse of a given time period. The given time period may be defined in a specification, notified/configured for the UE by the base station through higher layer signaling, or may be determined based on reported UE capability information.

The UE may control synchronization by using a plurality of synchronization signals or may control synchronization by using a single synchronization signal. For example, in a case of using a plurality of synchronization signals, the UE may apply equalization processing to reception results of a plurality of synchronization signals received in the past, to control the synchronization. In a case of using a single synchronization signal, the UE may control synchronization every time receiving a synchronization signal.

The given synchronization signal may be transmitted from a network (for example, the base station). Alterna-tively, the given synchronization signal may be transmitted from another UE/antenna port of another UE. Such another UE may be a UE for cooperation or a UE to form a pair in a case of performing cooperative transmission/cooperative reception between UEs/antenna ports.

As the synchronization signal, a channel/signal (for example, an SSB/TRS/CSI-RS) of an existing system (for example, Rel. 16 or a previous version) may be used, or a new channel/signal may be used. A synchronization signal to be used for synchronization between the base station and the UE and a synchronization signal to be used for synchroni-zation between the plurality of UEs may be configured in common or may be configured separately.

In a case of receiving/detecting a synchronization signal in a resource/occasion used for transmission of a synchro-nization signal, the UE may determine timing for coopera-tive transmission/cooperative reception between the UEs/antenna ports by using the received/detected synchronization signal.

The resource/occasion for a synchronization signal may be a resource/occasion for synchronization between the base station and the UE or may be a resource/occasion for UE-UE (antenna port-antenna port) synchronization. Alternatively, both the resource/occasion for synchronization between the base station and the UE and the resource/occasion for UE-UE (antenna port-antenna port) synchronization may be configured individually.

By performing synchronization between a given UE (or the antenna ports of the given UE) and another UE (the antenna ports of another UE) by using a synchronization signal as described above, it is possible to appropriately control UE cooperative MIMO.

Second Embodiment

The UE may perform such control as to share given information with another UE to which UE cooperative MIMO is applied. The given information may be at least one of transmission data, control information, and channel state information. The transmission data may be interpreted as transmission data information, UL data, DL data, a UL-SCH, or a DL-SCH.

In the following description, a case of transmitting transmission data (or a PUSCH/UL data/a UL-SCH) in UE cooperative MIMO is described as an example. However, the present embodiment is similarly applicable to a case of cooperatively transmitting another UL signal/UL channel (for example, uplink control information/PUCCH).

Figures 4A, 4B:
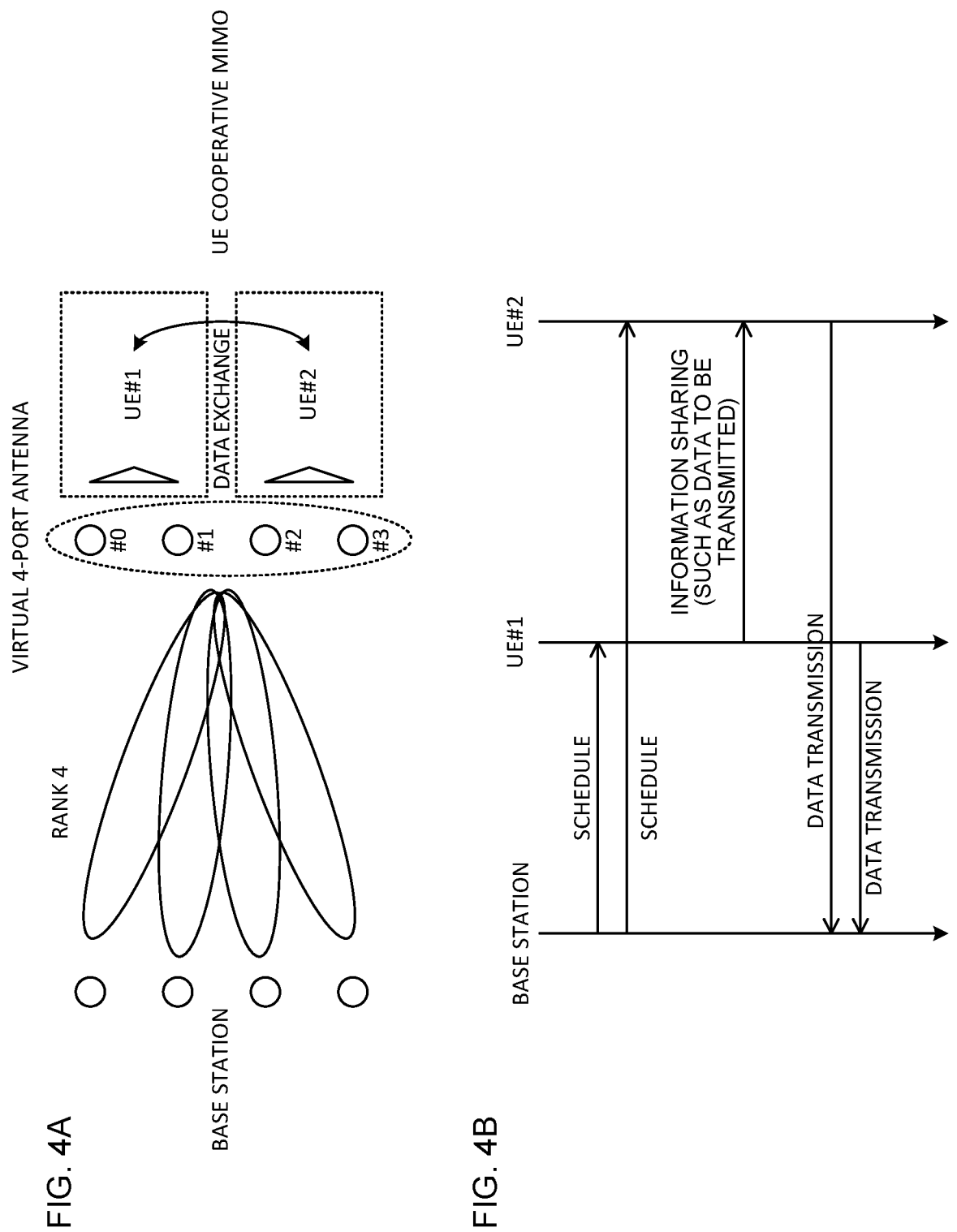
FIGS. 4A and 4B are diagrams to show an example of communication control in UE cooperative MIMO according to a second embodiment.

FIGS. 4A and 4B show an example of a case where a first UE (UE #1) and a second UE (UE #2) perform UL transmission in cooperation. FIG. 4A shows a case where UE #1 uses antenna ports #0 and #1 while UE #2 uses antenna ports #2 and #3 to perform transmission by using virtual four-port antenna. Note that the number of antenna ports of each UE (here, two per UE), the number of ranks/the number of layers used for cooperative transmission (here, four), and the number of UEs to perform cooperative transmission (here, two) are not limited to these numbers.

In FIG. 4B, a base station transmits information related to a UL transmission indication to the UEs. In the present disclosure, the information related to a UL transmission indication may be interpreted as information related to scheduling of UL transmission, information related to trigger of UL transmission, UL grant, and DL assignment (in a case of performing cooperative reception in DL).

Here, a case of also transmitting transmission data of UE #1 (for example, part of transmission data) from UE #2 is shown. In this case, information related to the transmission data of UE #1 may be reported to/notified to/transferred to/information-shared with (also referred to as transferred to/information-shared with below) UE #2. In other words, the information related to the transmission data of UE #1 is shared between UE #1 and UE #2.

The transmission data of UE #1 may be interpreted as UL data/UL-SCH corresponding to UE #1 and UL data/UL-SCH for UE #1. Note that UL data/UL-SCH may be interpreted as UL control information/UCI.

In response to transmission/notification of given information from UE #1 to UE #2, information sharing between UE #1 and UE #2 may be performed. For the information sharing, an existing communication scheme such as unlicensed band (or shared spectrum), WiFi, Bluetooth (registered trademark), or the like may be employed. For example, in FIG. 4B, UE #1 may transfer/information-share given information to/with UE #2 by using a higher layer. In other words, higher layer signaling may be used in UE-to-UE communication.

Alternatively, in the information sharing, sharing may be performed between UE #1 and UE #2 as a periodic report configured by the base station. Alternatively, in the information sharing, sharing may be performed between UE #1 and UE #2 as an aperiodic report triggered by the base station. Alternatively, the information sharing may have such a configuration that sharing is voluntarily performed between UE #1 and UE #2. Alternatively, each UE may have a configuration to be able to indicate/command a report or sharing of the given information to another UE.

Alternatively, such a control may be performed as to perform information sharing between UEs by using a channel for D2D or the like, based on a specification supported by D2D (for example, a physical layer specification/RAN 1 specification) and perform cooperative transmission between the plurality of UEs by using the shared information.

In FIG. 4B, the case where transmission data of UE #1 (for example, part of transmission data) is transmitted from UE #2 is shown. However, this is by no means restrictive. Transmission data of UE #2 (for example, part of transmission data) may be transmitted from UE #1. In this case, information sharing/information provision may be performed from UE #2 to UE #1 (refer to FIG. 5).

Figure 5:
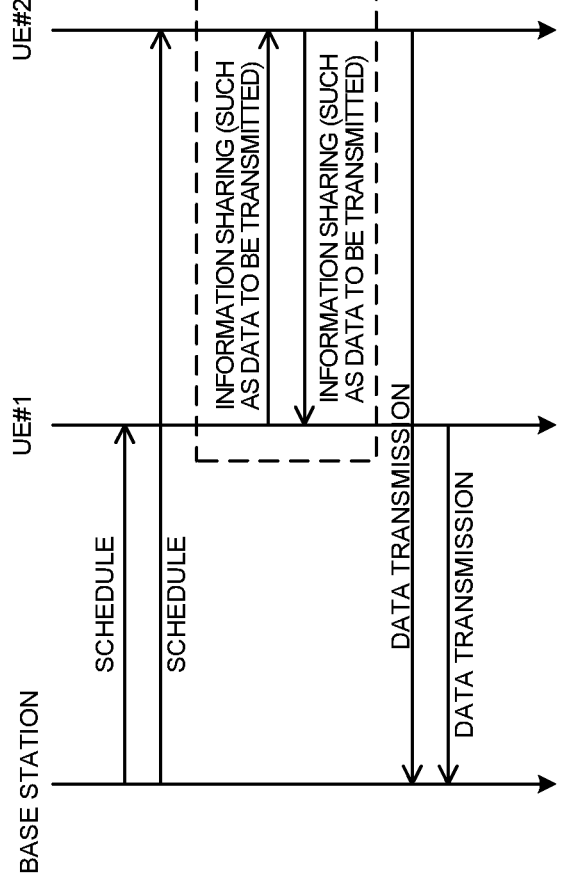
FIG. 5 is a diagram to show another example of the communication control in UE cooperative MIMO according to the second embodiment.

FIG. 5 shows a case of transferring information related to transmission data of UE #1 (for example, part of transmission data) from UE #1 to UE #2 and transferring information related to transmission data of UE #2 (for example, part of transmission data) from UE #2 to UE #1 is shown. A method of transferring transmission data from UE #2 to UE #1 may be controlled similarly to the method of transferring transmission data from UE #1 to UE #2.

By performing information sharing between the UEs, based on an indication from the base station and thereafter performing cooperative transmission by the plurality of UEs as described above, it is possible to appropriately control the cooperative transmission.

Third Embodiment

In a case where transmission/reception is performed using UE cooperative MIMO, such a control that a given parameter/configuration is shared between UEs/antenna ports may be performed. In this case, a parameter/configuration (for example, a first parameter/configuration) may be configured in common between the UEs/antenna ports. Meanwhile, another parameter/configuration (for example, a second parameter/configuration) may be configured separately (for example, differently) among the UEs/antenna ports.

A given parameter/configuration may be at least one of a configuration of a demodulation reference signal (for example, a configuration of DMRS or DMRS configuration), the number of layers/the number of ranks (for example, the number of MIMO layers/the number of MIMO ranks), a transmission signal resource, and a DMRS resource.

The DMRS configuration may be at least one of a time-direction DMRS symbol number, presence/absence of insertion of an additional DMRS, and a frequency-direction DMRS type (for example, type 1 or type 2).

The transmission signal resource (or a resource) may be at least one of time, frequency, a CDM/orthogonal code, a sequence number, and a cyclic shift number. The DMRS resource may be at least one of time, frequency, a CDM/orthogonal code, a sequence number, a cyclic shift number, a Comb index (for example, Comb index), and a CDM group index (for example, CDM group index). A base station may dynamically notify a UE of information related to the transmission signal resource/DMRS resource by using DCI at the time of transmission indication (or scheduling).

A network (for example, a base station) may configure the given parameter/configuration for a given UE by using higher layer/physical layer control information (for example, DCI). The given UE may be a plurality of UEs to perform cooperative transmission or may be part of the UEs to perform cooperative transmission (for example, a UE corresponding to data to be transmitted (or a transfer source UE of transmission data)). The given parameter/configuration may be configured separately (for example, as one for cooperative transmission) from normal transmission (for example, transmission between the UE and the base station).

In a case where the given parameter/configuration is configured by using higher layer/physical layer control information (for example, DCI), the UE may assume that the same content is also configured in the UE/antenna port to perform cooperative transmission with (for example, the UE/antenna port to be paired with). Alternatively, the UE may assume that the same content is configured in terms of one or some parameters/configurations while different contents are configured in terms of another parameter(s)/configuration(s).

Alternatively, in a case of configuring the given parameter/configuration, the UE may notify the UE/antenna port to be paired with of/indicate to the UE/antenna port, the same (or a different) content. The method used for information sharing between UEs in the second aspect may be used for the notification to the UE/antenna port to be paired with.

For example, the DMRS symbol number and the like may be configured to be the same for the plurality of UEs (for example, between UE #1 and UE #2), while the DMRS Comb index/CDM group index and the like may be configured separately (for example, differently) for the plurality of UEs. The transmission signal resource may be configured for the plurality of UEs in an overlapping manner or may be configured separately (for example, differently).

Figure 6:
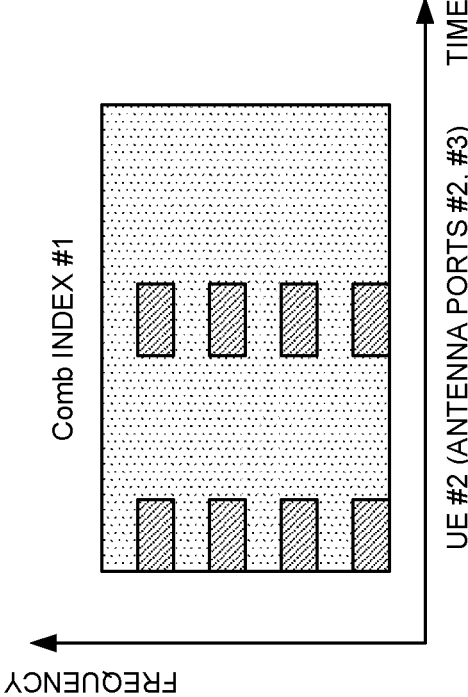
FIG. 6 is a diagram to show an example of resource allocation in UE cooperative MIMO according to a third embodiment.
Figure 6:
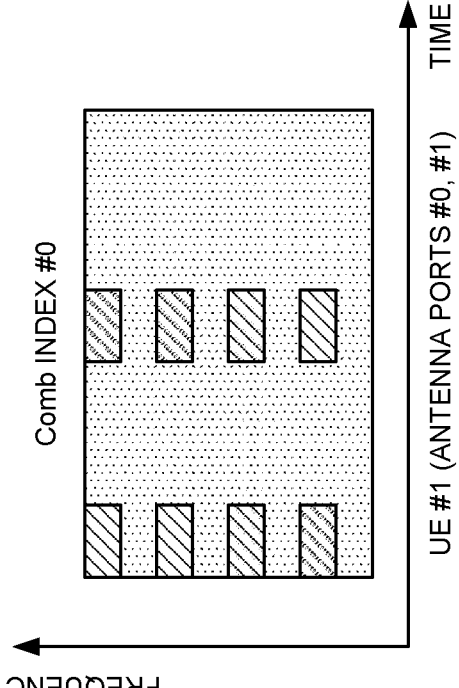

FIG. 6 is a diagram to show an example of resource configuration/resource assignment for UE #1 and UE #2 to perform transmission in cooperation. Here, a case where UE #1 uses antenna ports #0 and #1 for transmission while UE #2 uses antenna ports #2 and #3 for transmission is shown. Moreover, a case where the same content is configured as the first parameter/configuration (here, a DMRS symbol) while different contents are configured as second parameters/configurations (here, Comb indices), for UE #1 and UE #2 is shown. Note that the contents of the first parameter/configuration and the second parameter/configuration are not limited to these.

FIG. 6 shows a case where the transmission signal resources of UE #1 and UE #2 overlap with each other. However, this is by no means restrictive, and such a configuration that the transmission signal resources of UE #1 and UE #2 do not overlap (or partially overlap) with each other may be used.

By configuring one or some parameters in common and configuring the other parameter(s) separately for the plurality of UEs to perform UE cooperative MIMO as described above, it is possible to appropriately control UE cooperative MIMO transmission.

Fourth Embodiment

In a case where transmission/reception is performed using UE cooperative MIMO, a base station uses given DCI to transmit information related to scheduling of at least one UE of a plurality of UEs to perform transmission in cooperation.

The information related to scheduling may include at least one of a frequency resource to be used for transmission/reception, a time resource, transmission timing, and reception timing. The information related to scheduling may be interpreted as information related to a UL transmission indication or information related to a DL reception indication.

Transmission of the information related to scheduling may be controlled based on at least one of Aspects 4-1 to 4-3 below. Which one of Aspects 4-1 to 4-3 is to be applied may be defined in a specification or may be switched to configure by using higher layer signaling/DCI or the like. Configurable aspects may be restricted based on capability information of the UE (or capability information reported from the UE).

<Aspect 4-1>

DCI used for UL transmission indication/scheduling may be UE-specific DCI. In other words, scheduling may be performed for each UE by dedicated DCI (refer to FIG. 7A). The UE uses scheduling information for the terminal itself to perform transmission of data in cooperation with another UE (for example, UL-to-UL cooperative MIMO transmission).

Figure 7A:
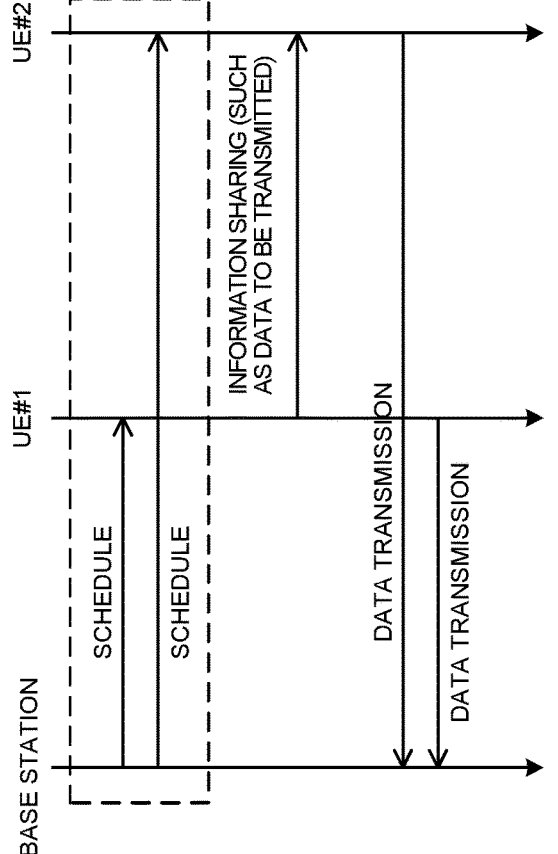
FIGS. 7A and 7B are diagrams to show an example of communication control in UE cooperative MIMO according to a fourth embodiment.

In FIG. 7A, a base station transmits schedule information to UE #1 and UE #2. Here, the base station may transmit, to UE #1, information related to schedule by using DCI corresponding to UE #1 (for example, UE #1-specific DCI). The base station may transmit, to UE #2, information related to schedule by using DCI corresponding to UE #2 (for example, UE #2-specific DCI).

UE #1 notifies UE #2 of (information-shares, with UE #2) information such as transmission data. For example, UE #1 may transfer/information-share information related to transmission data to be transmitted by using UE #2 (or the antenna ports of UE #2) to/with UE #2.

UE #1/UE #2 performs transmission in cooperation, based on the information related to the schedule received from the base station. Here, a case where UL data corresponding to UE #1 is transmitted from UE #1 (or the antenna ports of UE #1) and UE #2 (or the antenna ports of UE #2) is shown. Note that information transmitted in cooperation is not limited to UL data (or a UL-SCH) and may be UL control information (for example, UCI).

By notifying each UE of information related to schedule by using UE-dedicated DCI as described above, it is possible to flexibly control schedule for each UE.

<<Variations>>

FIG. 7A shows a case where UE #1 notifies UE #2 of (information-shares, with UE #2) information such as transmission data. However, this is by no means restrictive. UE #2 may also notify UE #1 of (information-shares, with UE #1) information such as transmission data (refer to FIG. 7B).

Figure 7B:
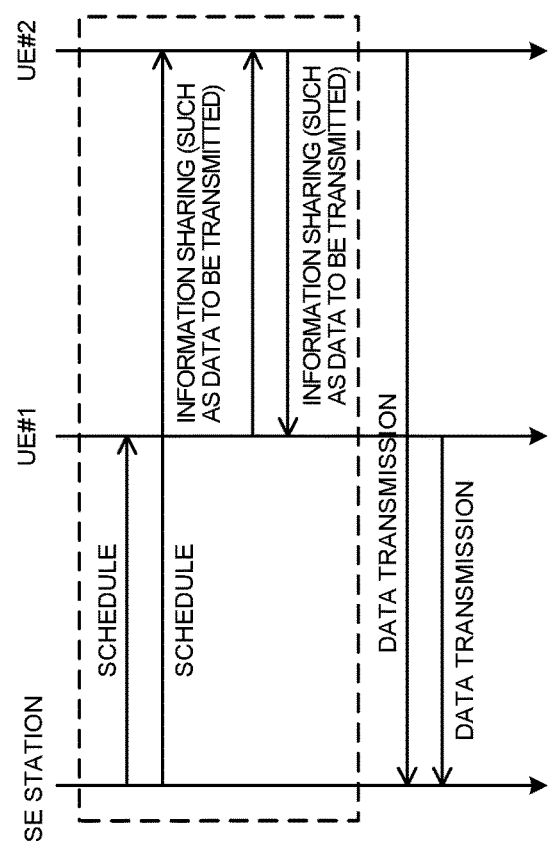

FIG. 7B shows a case where the base station notifies UE #1 of first schedule information and notifies UE #2 of second schedule information. Schedule information #1 and schedule information #2 may include at least one of (for example, both) information related to a resource to be used for transmission of information of which UE #1 notifies UE #2 (for example, information sharing 1) and information related to a resource to be used for transmission of information of which UE #2 notifies UE #1 (for example, information sharing 2).

<Aspect 4-2>

DCI used for UL transmission indication/schedule may be transmitted only to part of the plurality of UEs. In other words, only part of the UEs may be notified of information related to schedule by UE-dedicated DCI (refer to FIG. 8A). The information related to schedule may include, in addition to information related to schedule for the UE to which the DCI is transmitted, information related to schedule for another terminal.

Figures 8A, 8B:
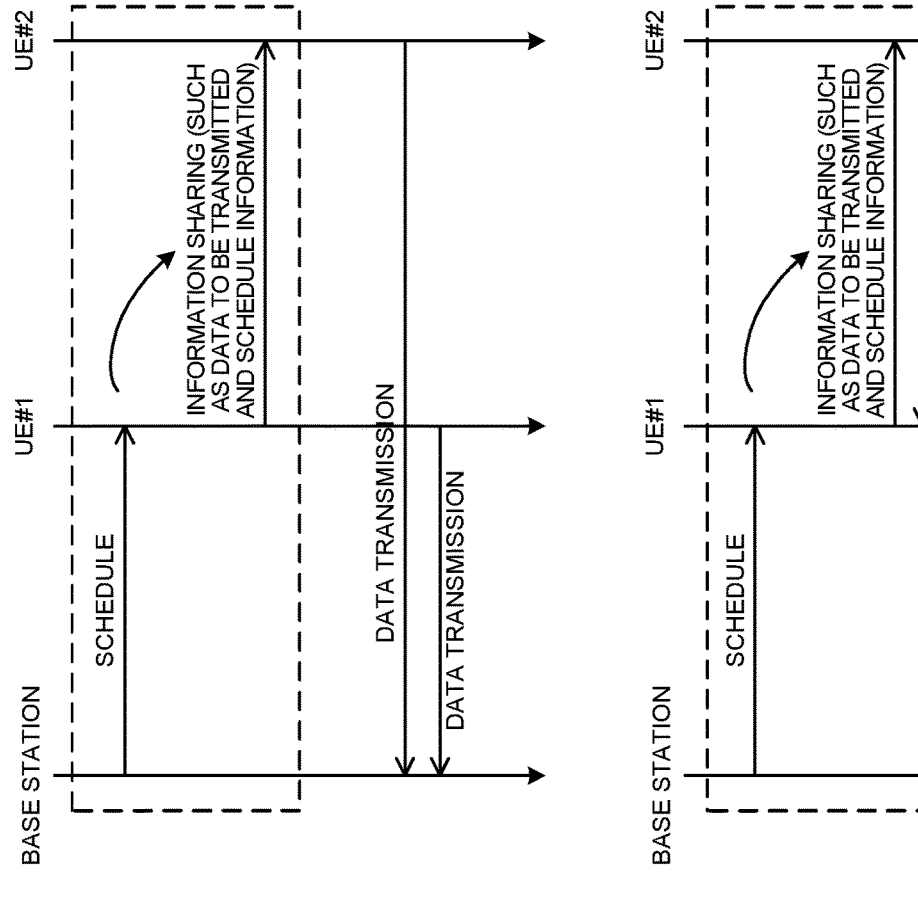
FIGS. 8A and 8B are diagrams to show another example of the communication control in UE cooperative MIMO according to the fourth embodiment.

In FIG. 8A, the base station transmits schedule information to UE #1. Here, the base station may transmit, to UE #1, information related to schedule by using DCI CRC scrambled with an RNTI (for example, a C-RNTI) corresponding to UE #1. The DCI may include information related to scheduling for UE #1 and information related to scheduling for UE #2.

UE #1 may notify UE #2 of information related to schedule of UE #2 as part of information sharing between the UEs. UE #2 may transmit UL data (for example, UL data notified by UE #1) by using UE-to-UE cooperative MIMO, based on the acquired scheduling information. Note that information transmitted in cooperation is not limited to UL data (or a UL-SCH) and may be UL control information (for example, UCI).

By notifying only part of the UEs of information related to schedule by using DCI as described above, it is possible to reduce an increase of the number of pieces of DCI to be transmitted.

<<Variations>>

FIG. 8A shows a case where UE #1 notifies UE #2 of (information-shares, with UE #2) information such as transmission data. However, this is by no means restrictive. UE #2 may also notify UE #1 of (information-shares, with UE #1) information such as transmission data (refer to FIG. 8B).

In FIG. 8B, schedule information of which the base station notifies UE #1 may include at least one of (for example, both) information related to a resource to be used for transmission of information of which UE #1 notifies UE #2 (for example, information sharing 1) and information related to a resource to be used for transmission of information of which UE #2 notifies UE #1 (for example, information sharing 2).

<Aspect 4-3>

DCI used for UL transmission indication/schedule may be DCI common to the plurality of UEs (for example, group-common DCI). In other words, the plurality of UEs (for example, UE #1 and UE #2) may be notified of information related to schedule by group-common DCI (refer to FIG. 9A).

Figure 9A:
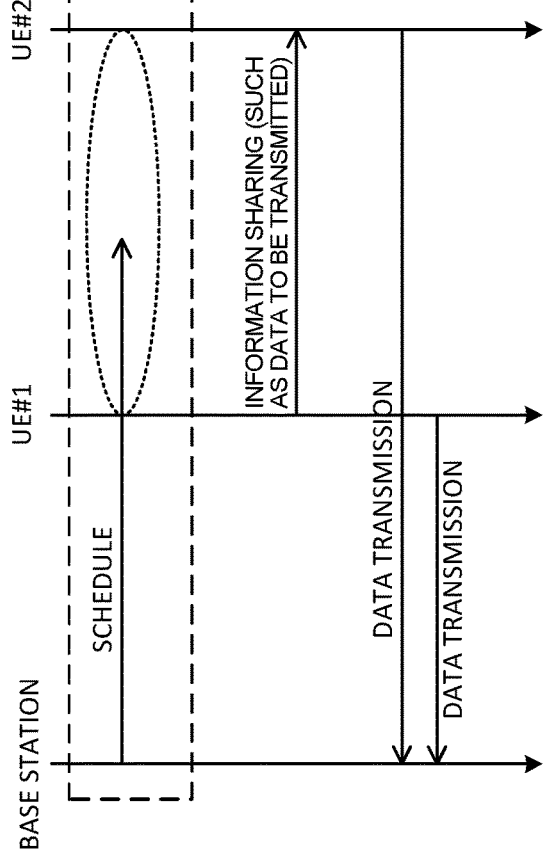
FIGS. 9A and 9B are diagrams to show another example of the communication control in UE cooperative MIMO according to the fourth embodiment.

In FIG. 9A, the base station transmits schedule information to UE #1 and UE #2. Here, the base station may transmit, to the plurality of UEs (for example, the pair of UE #1 and UE #2), information related to schedule by using DCI CRC scrambled with a common RNTI. The DCI may include information related to scheduling for UE #1 and information related to scheduling for UE #2.

Each UE may obtain information related to scheduling for the terminal itself, from the group common DCI. The base station may notify the UEs of/configure, for the UEs, the common RNTI for the plurality of UEs by using higher layer signaling or the like.

UE #1 notifies UE #2 of (information-shares, with UE #2) information such as transmission data. For example, UE #1 may transfer/information-share, to/with UE #2, information related to transmission data to be transmitted by using UE #2 (or the antenna ports of UE #2).

UE #1/UE #2 performs transmission in cooperation, based on the information related to the schedule received from the base station. Here, a case where UL data corresponding to UE #1 is transmitted from UE #1 (or the antenna ports of UE #1) and UE #2 (or the antenna ports of UE #2) is shown. Note that information transmitted in cooperation is not limited to UL data (or a UL-SCH) and may be UL control information (for example, UCI).

By notifying the plurality of UEs of information related to schedule by using DCI common to the plurality of UEs as described above, it is possible to eliminate the need for transmitting DCI separately for each of the UEs.

<<Variations>>

FIG. 9A shows a case where UE #1 notifies UE #2 of (information-shares, with UE #2) information such as transmission data. However, this is by no means restrictive. UE #2 may also notify UE #1 of (information-shares, with UE #1) information such as transmission data (refer to FIG. 9B).

Figure 9B:
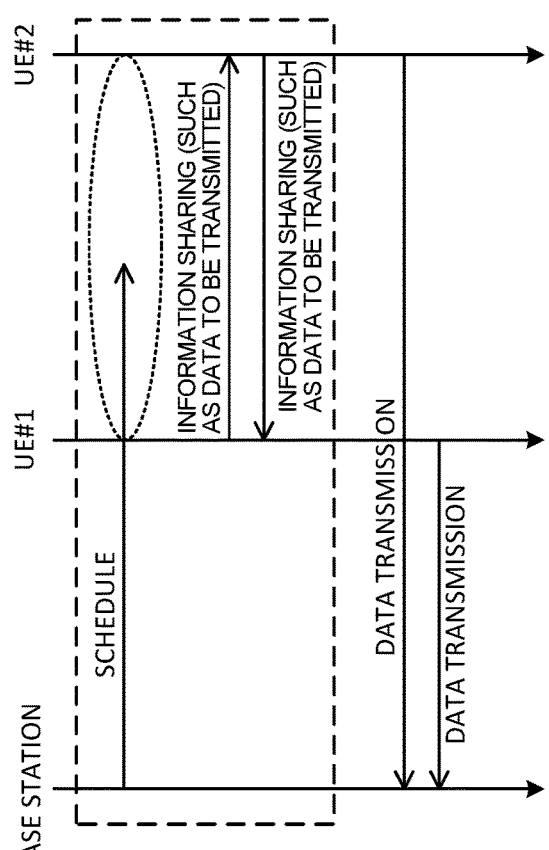

In FIG. 9B, schedule information of which the base station notifies UE #1 and UE #2 may include at least one of (for example, both) information related to a resource to be used for transmission of information of which UE #1 notifies UE #2 (for example, information sharing 1) and information related to a resource to be used for transmission of information of which UE #2 notifies UE #1 (for example, information sharing 2).

In Aspect 4-1, each UE may assume that scheduling (for example, resource control or the like) of UL data (or a UL-SCH) or a PUSCH to be transmitted by the terminal itself is performed by using DCI for the terminal itself.

In Aspect 4-2/Aspect 4-3, UE #1 may receive control information for UE #2. In this case, control information for the individual UEs can be transmitted by using a single piece of DCI.

In a case where control signals for the individual UEs (here, UE #1 and UE #2) are transmitted by using a single piece of DCI, a dedicated DCI field may be configured for each UE in the DCI (Option 4-1). Alternatively, a DCI field common to the UEs may be configured in the DCI, to notify each UE of a different value (Option 4-2).

<<Option 4-1>>

Figures 10A, 10B:
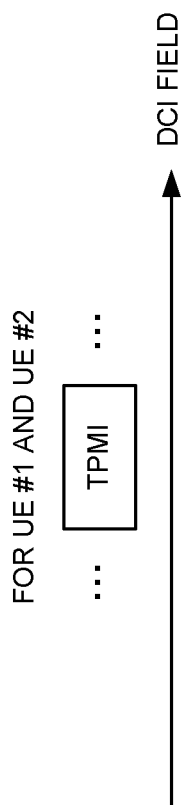
FIGS. 10A and 10B are diagrams to show an example of DCI used in UE cooperative MIMO according to the fourth embodiment.

In a single piece of DCI, a dedicated DCI field may be defined for each UE (refer to FIG. 10A). FIG. 10A shows a case where a TPMI field is configured for each UE in DCI. For example, in an existing DCI field, the TPMI field may be enhanced to configure fields that enable a different TPMI indication for each UE.

The DCI field for each UE may be only a given DCI field (or a DCI field of a given type). A value common to the UEs may be assumed (or may be applied to the UEs in common) for each field for which no dedicated DCI field for each UE is configured.

The DCI field configured for each UE in a dedicated manner may be a field related to at least one of a precoder for UL MIMO, a rank indicator, a UL beam indicator (for example, TPMI/SRI), and a TPC command (for example, a TPC command of a PUSCH).

Alternatively, in a case where DCI indicates a Comb index of a DMRS (or a CDM group index), a field related to the DMRS Comb index (or the CDM group index) may be configured for each UE in a dedicated manner.

Alternatively, in a case of supporting different resource indications for the UEs, a field related to a time resource/frequency resource may be configured for each UE in a dedicated manner.

DCI fields configured to be the same/in common among the UEs may be a DCI format notification (DCI format indicator) field, the timing indicator field, and the like.

<<Option 4-2>>

The UEs may be notified of respective different values in a DCI field common to the UEs (refer to FIG. 10B). For example, information for a code point of each piece of DCI (or each bit value of the DCI field) may be configured for each UE through higher layer signaling or the like.

FIG. 10B shows a case where a TPMI field corresponding to UE #1 and UE #2 are configured in common in DCI and a correspondence relationship between the code point of the TMPI field and a TMPI index is configured separately for each UE. By using the TPMI field in common as described above, it is possible to specify a different TPMI index for each UE.

<Use of DCI Format>

For UL transmission (for example, PUSCH transmission) in which transmission is performed in cooperation by the UEs, a given DCI format may be defined. Alternatively, a given DCI format for resource assignment/schedule to be used for signal transmission between the UEs (for example, information sharing) may be defined. The given DCI format may be configured by replacing bits in an existing DCI format or the like.

For example, the given DCI format may include at least one of a field to be used for UL transmission in which transmission is performed in cooperation (for example, PUSCH transmission) and a field indicating a resource to be used for UE-to-UE signal transmission (for example, information sharing between the UEs).

Figure 11:
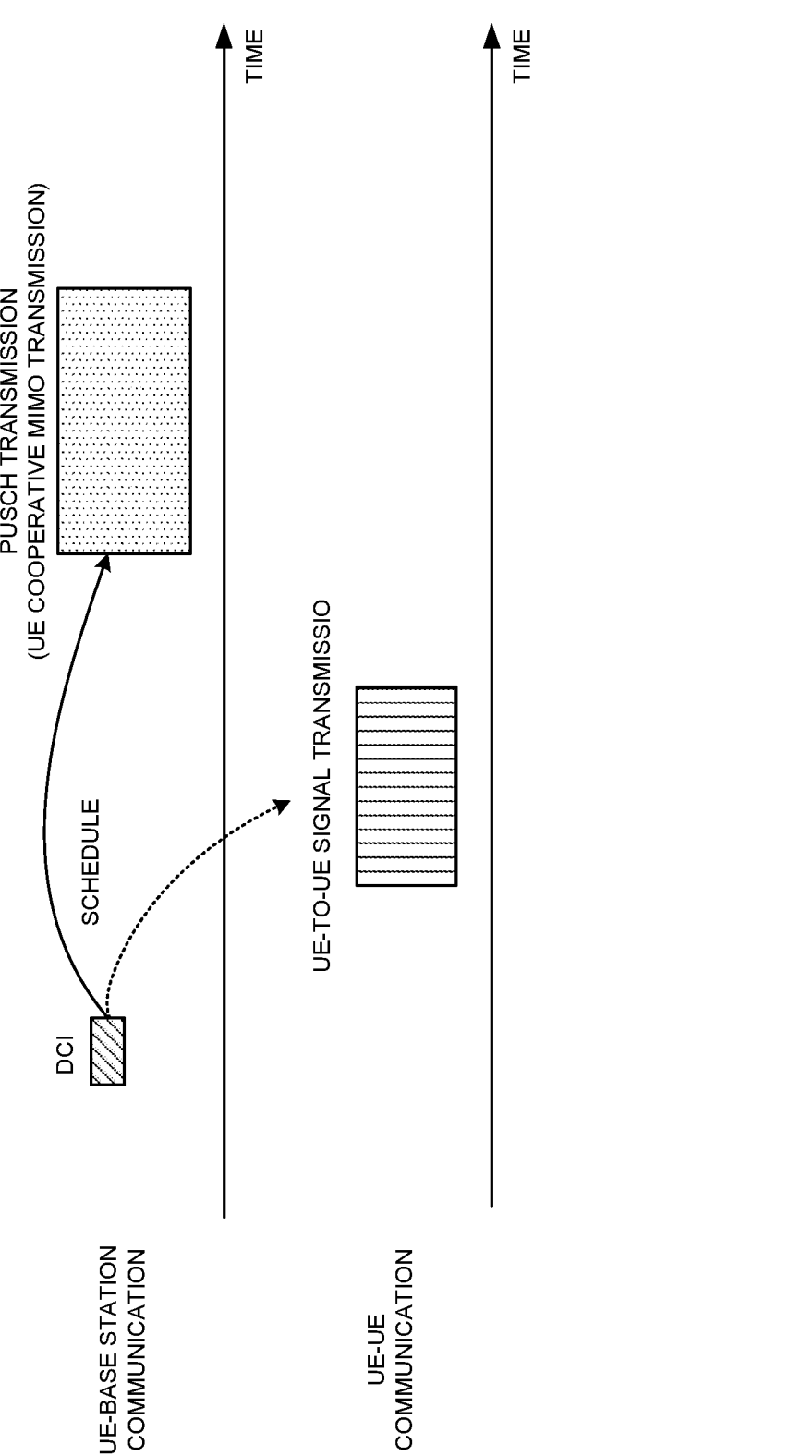
FIG. 11 is a diagram to show another example of the communication control in UE cooperative MIMO according to the fourth embodiment.

The base station may indicate at least one of (for example, both) schedule of PUSCH transmission (for example, UL cooperative PUSCH transmission), a condition/schedule of UE-to-UE signal transmission in UE-to-UE communication (for example, resource assignment or the like) by using a given DCI format (refer to FIG. 11).

A field to be used for PUSCH transmission (for example, UE cooperative PUSCH transmission) may be a field related to at least one of a precoder for UL MIMO, a rank indicator, a UL beam indicator (for example, TPMI/SRI), and a TPC command (for example, a TPC command of a PUSCH).

Alternatively, in a case where DCI indicates a Comb index of a DMRS (or a CDM group index), a field related to the DMRS Comb index (or the CDM group index) may be configured.

Alternatively, in a case where the UEs support different resource indications, a field related to a time resource/frequency resource may be configured.

The field indicating a resource to be used for UE-to-UE signal transmission may be a field related to a time resource/frequency resource or may be a field related to a TPC command. The field related to a time resource/frequency resource may be configured in a case where different resource indications are supported by the UEs. The field related to a TPC command may be configured in a case where closed loop TPC (for example, CL-TPC) is performed in UE-to-UE signal transmission.

Given DCI (or a given PDCCH) indicating at least one of UE-to-UE cooperative PUSCH transmission and resource assignment/schedule for UE-to-UE signal transmission may have a configuration of being received/detected in a given control resource set/search space. The given control resource set/search space may be interpreted as at least one of a given time resource, a given frequency resource, and a given subcarrier spacing.

The UE may attempt to detect (for example, blind-detect) DCI indicating UE cooperative PUSCH transmission in the given control resource set/search space. In this case, such a control as not to detect DCI (or a PDCCH) corresponding to UE cooperative PUSCH transmission may be performed in another control resource set/search space.

Alternatively, the given DCI (or the given PDCCH) may have a configuration of being received/detected in any control resource set/search space.

The UE may attempt to detect (for example, blind-detect) DCI indicating UE cooperative PUSCH transmission in a configured control resource set/search space. The UE may determine whether a UE cooperative PUSCH is scheduled, based on whether or not the given DCI (or the given PDCCH) is CRC scrambled with an RNTI for UE cooperative PUSCH transmission. Alternatively, the UE may determine whether the UE cooperative PUSCH is scheduled, based on a given field of DCI.

<Use of Plurality of Pieces of DCI>

In the fourth embodiment, a case where Operation 1 and Operation 2 below are performed by using a single piece of DCI (or a single PDCCH) is described.

Operation 1: schedule of a UE cooperative PUSCH and assignment of UE-to-UE signal transmission resources Operation 2: schedule of a PUSCH (for example, a PUSCH resource) of UE #1 and schedule of a PUSCH of UE #2

The fourth embodiment is not limited to this, and DCI/PDCCH may be transmitted a plurality of times (for example, twice). Part of information (for example, information related to schedule) may be transmitted in first DCI, and the remaining information may be transmitted in second DCI. With this, it is possible to reduce the number of DCI bits per transmission and to decrease the coding rate/improve the error rate.

Figure 12:
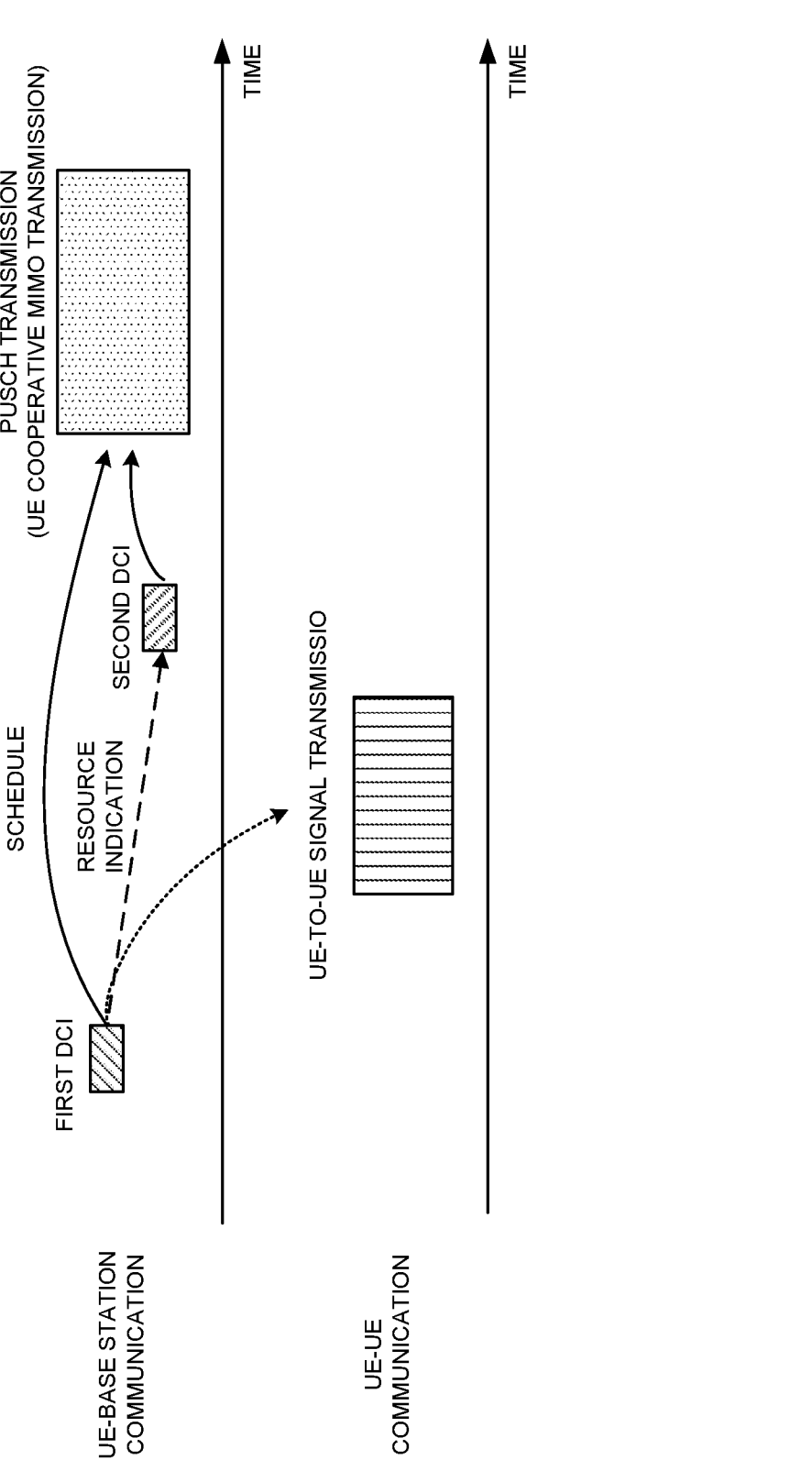
FIG. 12 is a diagram to show another example of the communication control in UE cooperative MIMO according to the fourth embodiment.

For example, UE-common information may be transmitted by using the first DCI, and UE-dedicated information may be transmitted by using the second DCI (refer to FIG. 12).

The first DCI may be CRC scrambled with an RNTI corresponding to given group-common. The first DCI may include information related to at least one of a second DCI/PDCCH resource, a monitoring occasion, a search space, and a control resource set. In this case, it is possible to reduce the number of times the second DCI is detected and the like.

The first DCI may have a configuration including a UE-common DCI field. For example, a field specifying a parameter to be configured for the UEs in common may be included in the first DCI. The field may be at least one of a PUSCH timing indicator (for example, Timing indicator) field, a PUSCH time/frequency resource indicator field, and a UE-to-UE signal transmission resource indicator field, for example.

The second DCI may be CRC scrambled with a UE-dedicated RNTI. The second DCI may have a configuration including a UE-dedicated DCI field. For example, a field specifying a parameter to be configured in a UE-dedicated manner may be included in the second DCI. The field may be, for example, at least one of a UL MIMO precoder/rank indicator field, a UL beam indicator (TPMI/SRI) field, a DMRS comb index (or CDM group index) field, and a TPC command field.

FIG. 12 shows a case where the first DCI is group-common while the second DCI is UE-dedicated. However, this is by no means restrictive. Both the first DCI and the second DCI may be UE-dedicated. The first DCI and the second DCI may be transmitted in the same slot/same CC/same BWP or may be transmitted in different slots, different CCs/different BWPs.

The first DCI/second DCI may include a DAI field (for example, a counter DAI/total DAI). The counder DAI indicates a count value of the DCI (or the PDCCH), while the total DAI indicates the total number of pieces of DCI (or PDCCHs). In this way, even when the UE has failed to receive one of pieces of DCI, it is possible to determine that detection of the first DCI/second DCI has been failed, based on the counter DAI/total DAI included in each piece of DCI.

In a case where reception of the first DCI and the second DCI (or two-step DCI) is configured/defined and the UE receives only one of the first DCI (for example, group-common DCI) and the second DCI (for example, UE-dedicated DCI), the UE may detect a reception error of one of the pieces of DCI.

In a case where a HARQ process ID field is included in the first DCI and the second DCI, the UE may assume that the first DCI and the second DCI including the same HARQ process ID correspond to each other. In a case where the UE has received only one of the first DCI and the second DCI for the same HARQ process ID (for example, in a given time content), the UE may detect an error of one of the pieces of DCI.

The orders of transmission/reception of the first DCI and the second DCI may be defined. For example, it may be configured that the second DCI is transmitted/received after the first DCI. With this, it is possible to simplify operation of detecting an error of the pieces of DCI in the UE.

In a case where an error has occurred in any of the pieces of DCI, the UE may perform such control as not to perform UE-to-UE communication/UE cooperative PUSCH transmission. In a case of not receiving PUSCH transmission from the UE (UE cooperative PUSCH transmission), the base station may determine that the UE has failed to detect the first DCI/second DCI and retransmit the DCI.

Alternatively, in a case where an error has occurred in given DCI, the UE may perform such control as not to perform UE-to-UE communication/UE cooperative PUSCH transmission. For example, in a case where the UE has failed to detect the first DCI while having received the second DCI, the UE may perform such control as to perform UE-to-UE communication but not to perform UE cooperative PUSCH transmission. In a case where the UE has received the first DCI while having failed to detect the second DCI, the UE may perform such control as to perform neither UE-to-UE communication nor UE cooperative PUSCH transmission. With this, it is possible to appropriately use DCI that has been received correctly.

Fifth Embodiment

In a case where UL transmission is performed by using UE cooperative MIMO, the UE may perform such control as to report to/notify to/transfer to/information-share with (also referred to as transfer to/information-share with) another UE, data/control information including transmission data of the physical data in a given unit.

Figures 13A, 13B:
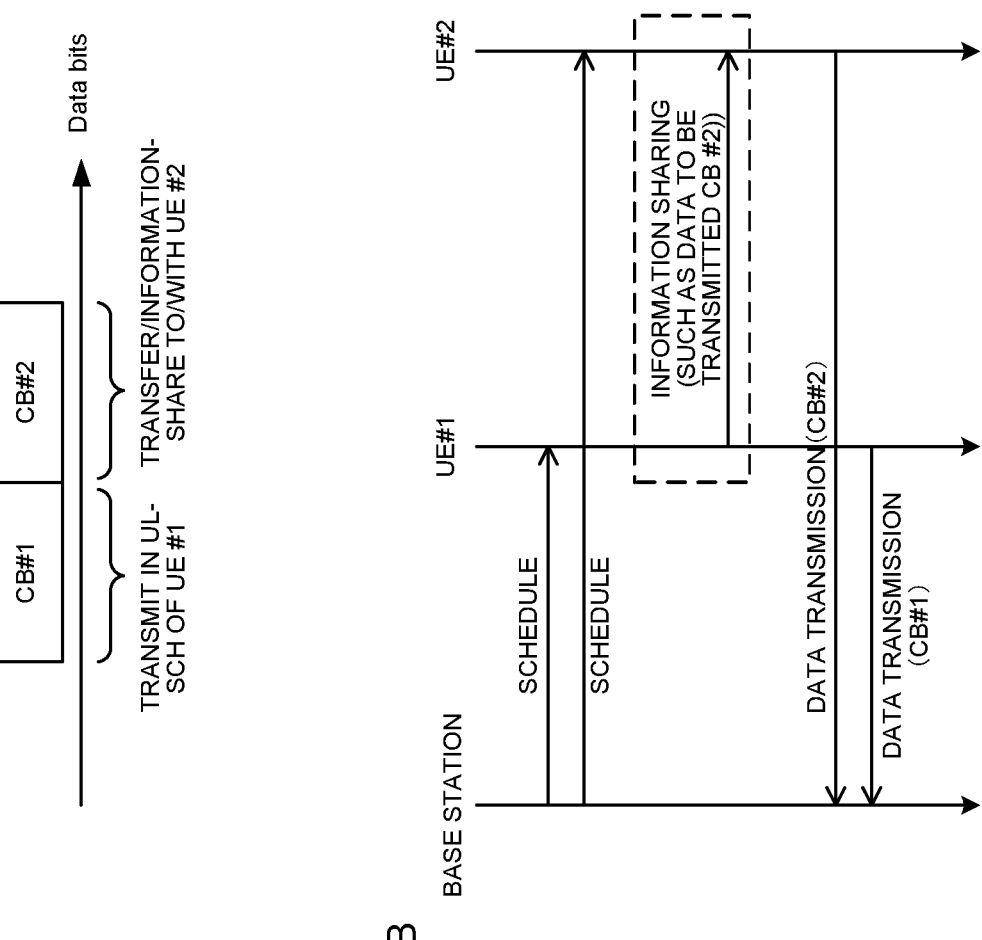
FIGS. 13A and 13B are diagrams to show an example of control for UE-to-UE information sharing in UE cooperative MIMO according to a fifth embodiment.

The UE may divide UL data to be transmitted from the terminal itself, in a given unit (refer to FIG. 13A) and transfer/information-share the UL data to/with another UE (refer to FIG. 13B). The given unit may be at least one of a unit of transport block (TB), codeword (CW), code block (CB), and bit. FIGS. 13A and 13B show a case of division in a unit of CB. However, this is not restrictive.

The UE may divide part of TBs/CWs/CBs of UL data to be transmitted from the terminal itself to thereby divide the UL data into data to transmit in the UL-SCH of the terminal itself and data to transfer to/information-share with another UE. Through division in a unit of TB/CW/CB, it is possible to appropriately perform error determination/retransmission.

For example, in a case where the UL data is divided in a unit of CB, even if an error occurs in the UL data (CB) transmitted from one of the UEs, it is possible to retransmit only the erroneous CB. In contrast, in a case where UL data is divided in a unit of bit, such control as to retransmit all the CBs may be performed if an error occurs in part of the CBs.

The division of UL data transmitted from the terminal itself (for example, UE #1) and UL data transmitted from another UE (for example, UE #2) (for example, the bound-ary dividing the pieces of UL data) may be configured by a higher layer or the like or may be determined based on a given rule.

The configuration by the higher layer may be configured based on the number of TBs/CWs/CBs, may be configured based on the number of bits of the UL-SCH of each UE, or may be configured based on the coding rate of the UL-SCH of each UE.

The given rule may be to make the numbers of bits of the UL-SCHs of the plurality of UEs (for example, UE #1 and UE #2) equal to each other. The UE may separate data corresponding to the terminal itself (for example, data to be transmitted from the antenna ports of the terminal itself to the base station) and data corresponding to another terminal (for example, data transmitted from the antenna ports of another terminal to the base station), based on the given rule. The UE may assume that the first part of the divided pieces of data (for example, TBs/CW/CBs/bits) to be data for the terminal itself and the second part to be data for another terminal.

<UE-to-UE Information Sharing>

In a case where the UE (for example, UE #1) transfers to/information-shares with another UE (for example, UE #2), the UE may use a scheme/mechanism of a communication system other than 3GPP. For example, UE #1 may perform such control as to transmit given information to UE #2 by using wireless RAN (for example, WiFi), short-range data communication (for example, Bluetooth) (refer to FIG. 14). The UE making notification of given information by using the scheme/mechanism of another communication system may correspond to transmission of physical layer information to be transferred to a higher layer for UE-to-UE communication. UE #2 may perform such control as to transmit physical layer information received from the higher layer, in the UL-SCH.

Figure 14:
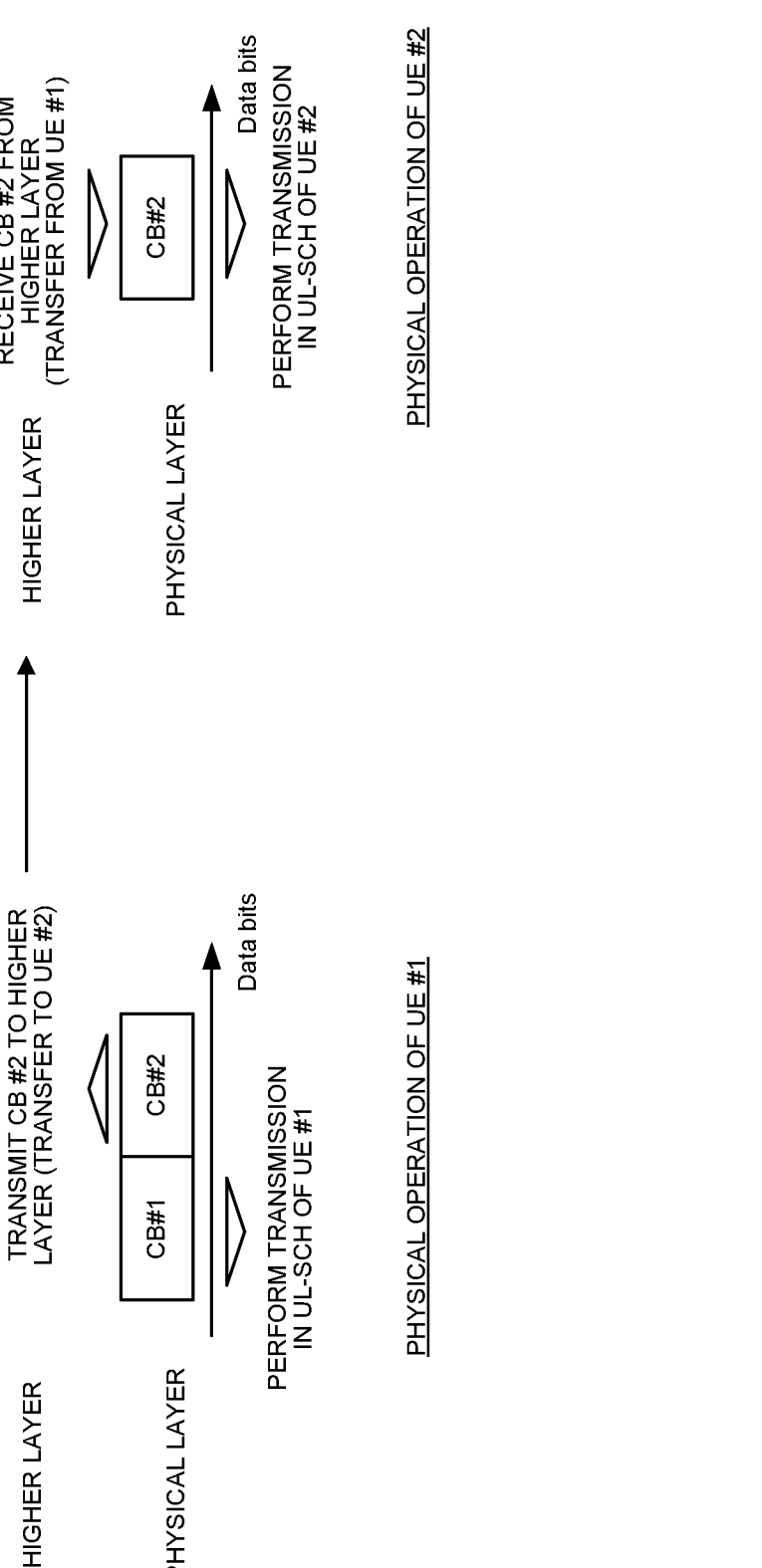
FIG. 14 is a diagram to show another example of the control for UE-to-UE information sharing in UE cooperative MIMO according to the fifth embodiment.

In FIG. 14, UE #1 transmits CB #2 of UL data (for example, CB #1+CB #2) to UE #2 by using a higher layer. FIG. 14 shows a case where UE #1 then transmits CB #1 as UL data (for example, in the UL-SCH of UE #1), and UE #2 transmits CB #2 as UL data (for example, in the UL-SCH of UE #2).

Alternatively, in a case where the UE (for example, UE #1) performs transfer to/information-sharing with another UE (for example, UE #2), the UE may use a UE-to-UE transmission/reception scheme of the physical layer. For example, UE #1 may perform such control as to transmit given information to UE #2 by using at least one of a channel for D2D and a sidelink (refer to FIG. 15).

Figure 15:
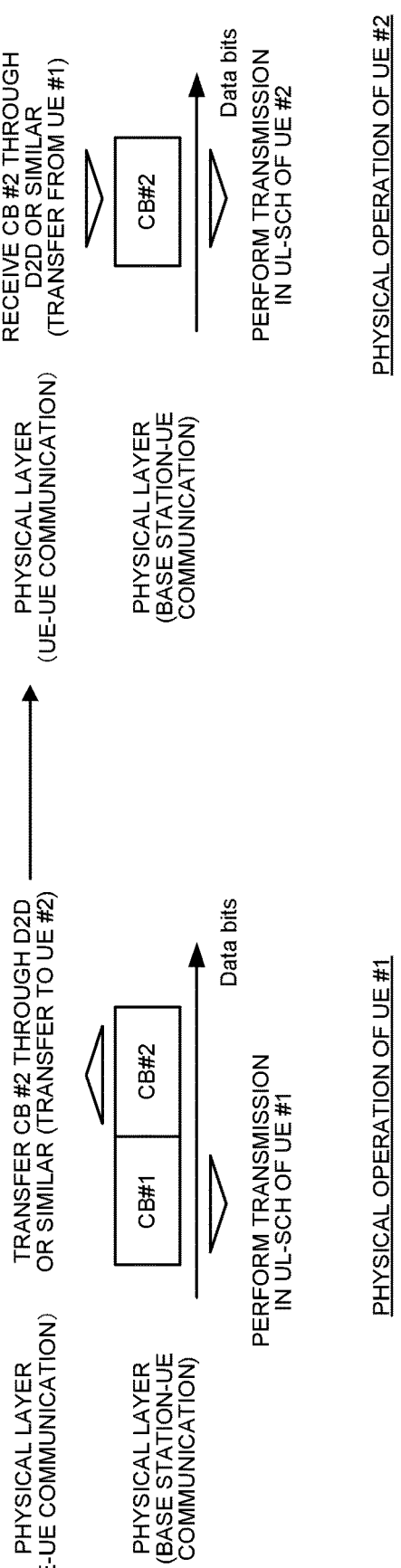
FIG. 15 is a diagram to show another example of the control for UE-to-UE information sharing in UE cooperative MIMO according to the fifth embodiment.

In FIG. 15, UE #1 transmits CB #2 of UL data (for example, CB #1+CB #2) to UE #2 by using D2D/sidelink. FIG. 14 shows a case where UE #1 then transmits CB #1 as UL data (for example, in the UL-SCH of UE #1), and UE #2 transmits CB #2 as UL data (for example, in the UL-SCH of UE #2).

In a case of using a UE-to-UE transmission/reception scheme of the physical layer, the base station may control schedule. In a case of applying D2D/sidelink in UE-to-UE information sharing, at least one of a configuration that a resource is autonomously selected between a plurality of UEs for control of transmission (Aspect 5-1) and a configuration that the base station selects/schedules a transmission resource for a plurality of UEs for control of transmission (Aspect 5-2) may be applied.

<Aspect 5-1>

In a case where a resource is autonomously selected between the UEs for control of transmission, the base station may configure a resource pool through higher layer signaling for each UE. The UE may autonomously select a resource, based on the resource pool for transmission to another UE (refer to FIGS. 16A and 16B).

Figures 16A, 16B:
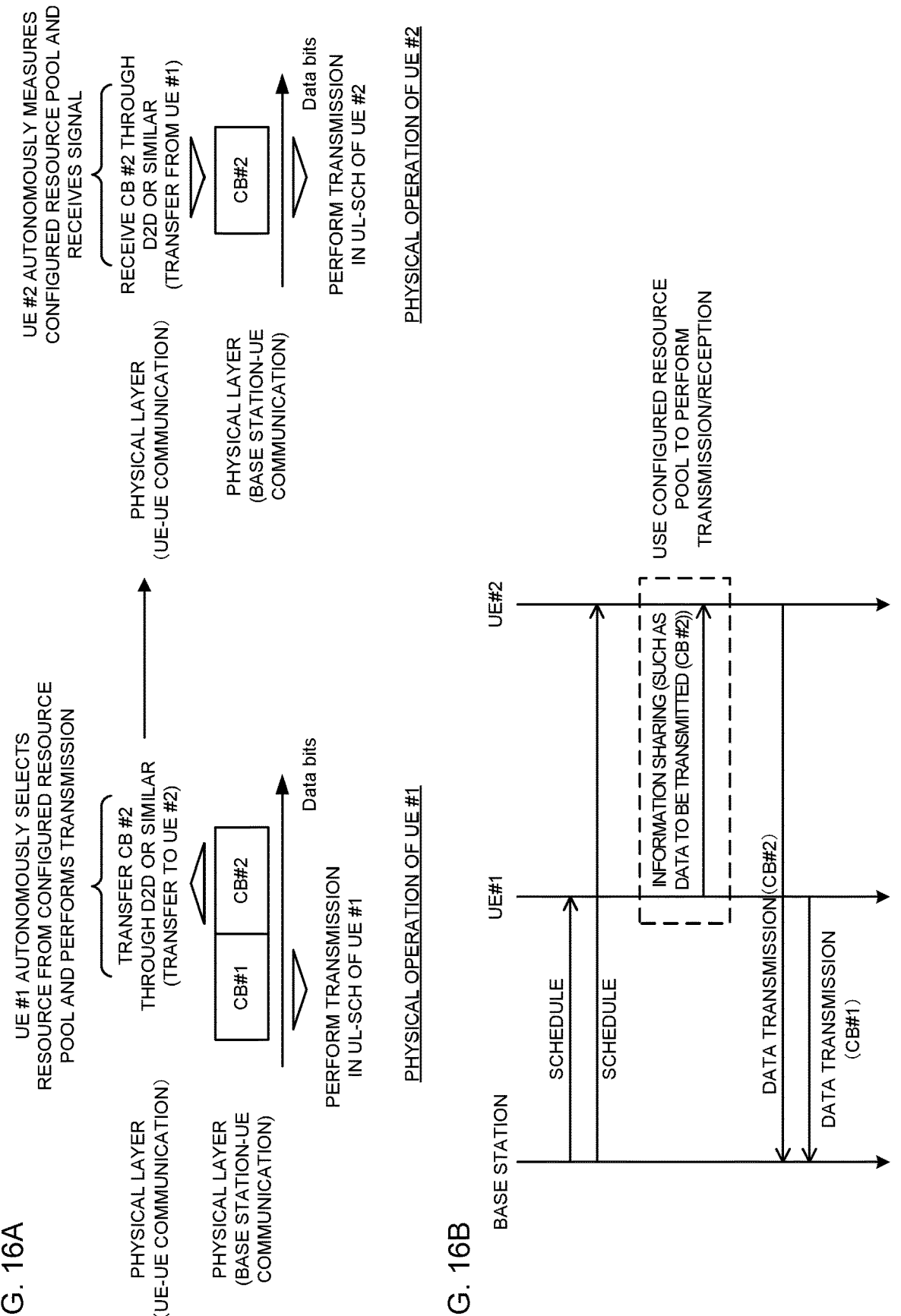
FIGS. 16A and 16B are diagrams to show another example of the control for UE-to-UE information sharing in UE cooperative MIMO according to the fifth embodiment.

In FIGS. 16A and 16B, UE #1 uses a resource in a resource pool configured in advance by a higher layer, to transmit some UL data (for example, CB #2) of the UL data (for example, CB #1+CB #2) to UE #2. FIGS. 16A and 16B show a case where UE #1 then transmits CB #1 as UL data (for example, in the UL-SCH of UE #1), and UE #2 transmits CB #2 as UL data (for example, in the UL-SCH of UE #2). The base station may simultaneously perform schedule of UL data for each UE and schedule of UE-to-UE cooperative transmission.

FIG. 16B shows a case of transmitting UE-dedicated DCI to each UE (Aspect 4-1). However, the method described in Aspect 4-2/4-3 may be applied.

In a case where the UE configured with the resource pool by the higher layer transmits a signal in UE-to-UE communication, the UE only needs to select a resource from the resource pool and transmit a signal to another terminal by using the selected resource. In this case, the UE may determine a state (for example, whether there is availability) of the resource pool by autonomously performing carrier sensing or the like or may determine the state of the resource pool, based on information made known/reported or indicated by the base station.

The selection from the resource pool may be randomly performed by the UE, based on a random number or the like or may be performed based on a given rule. The receiving-side UE (for example, UE #2) may receive/measure the resource (or the resource pool) configured by the higher layer to receive a signal for the terminal itself. Whether the signal is for the terminal itself may be determined, for example, by whether the CRC inserted into data can be solved based on the ID of the terminal itself (or a C-RNTI) (for example, CRC check).

Alternatively, the UE may not necessarily use a resource pool in UE-to-UE information sharing. In this case, as in CSMA/CA (Carrier Sense Multiple Access/Collision Avoidance) of WiFi, LBT (Listen Before Talk) in NRU (NR unlicensed), such control as to perform transmission when a resource is available may be performed, and the receiving side may decode a received signal to determine whether the signalization is for the terminal itself, based on information such as a MAC header or the like.

<Aspect 5-2>

In a case where the base station selects a resource for UE-UE transmission, the base station may indicate/schedule, to/for each UE, a resource to be used for the UE-UE transmission. The UE may control UE-UE transmission by using a resource scheduled by the base station (refer to FIGS. 17A and 17B).

The data transfer source UE (here, UE #1) to which a resource is assigned by the base station uses the assigned resource to divide physical layer data (TBs/CWs/CBs) and transmits part (here, CB #2) of the data to UE #2, which is another UE. The data transfer source UE (here, UE #2) to which a resource is assigned by the base station may measure/receive the assigned resource, receive the physical layer data (TB/CW/CB) obtained through the division, and perform transmission to the base station by using the UL-SCH of UE 2.

Figures 17A, 17B:
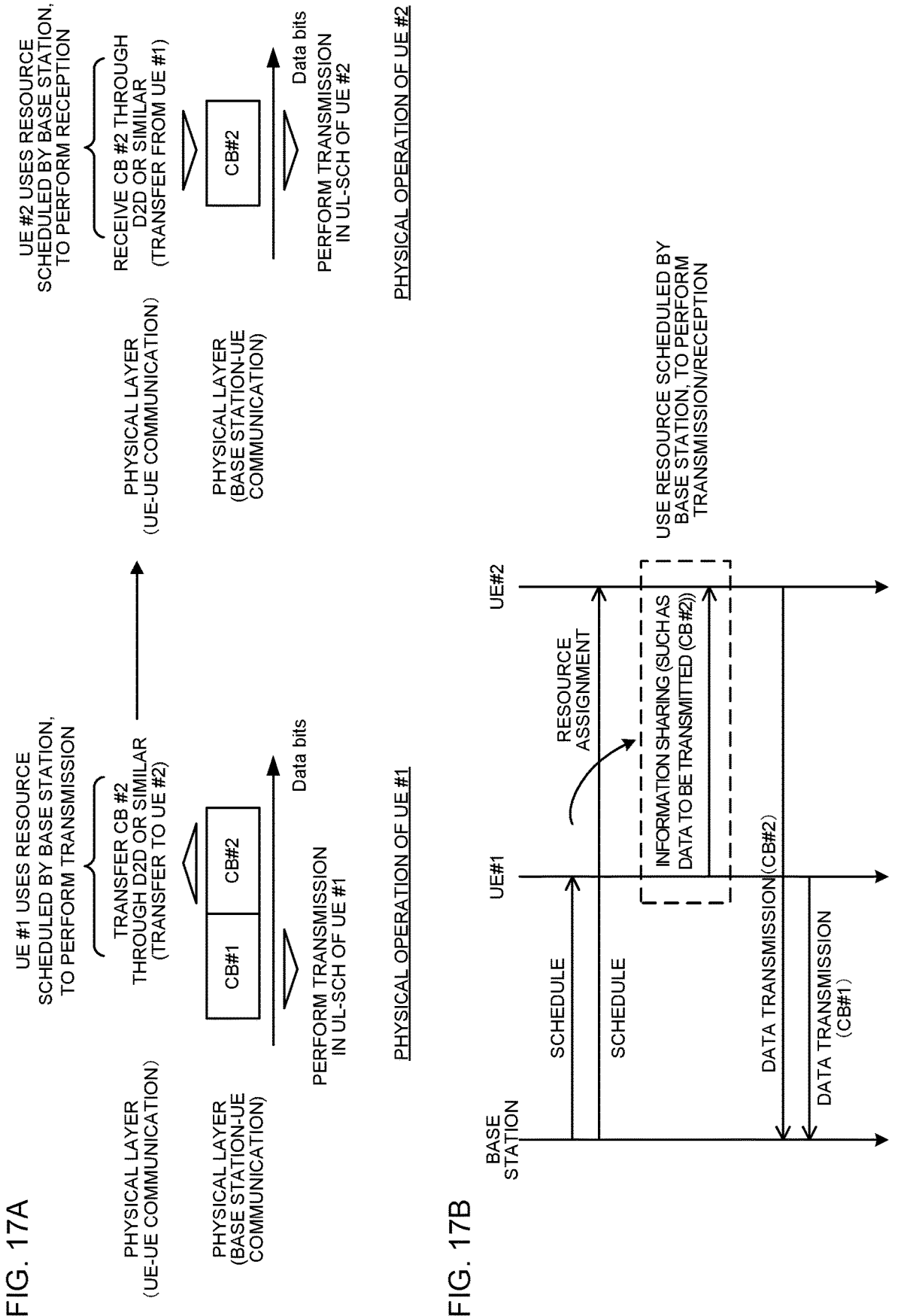
FIGS. 17A and 17B are diagrams to show another example of the control for UE-to-UE information sharing in UE cooperative MIMO according to the fifth embodiment.

In FIGS. 17A and 17B, UE #1 uses the resource scheduled by the base station to transmit part (for example, CB #2) of the UL data (for example, CB #1+CB #2) to UE #2. FIGS. 17A and 17B show a case where UE #1 then transmits CB #1 as UL data (for example, in the UL-SCH of UE #1), and UE #2 transmits CB #2 as UL data (for example, in the UL-SCH of UE #2). The base station may simultaneously perform schedule of UL data for each UE and schedule of UE-to-UE cooperative transmission.

FIG. 17B shows a case of transmitting UE-dedicated DCI to each UE (Aspect 4-1). However, the method described in Aspect 4-2/4-3 may be applied.

Sixth Embodiment

In a case where communication is performed by using UE cooperative MIMO, the base station may grasp channel information between each UE and the base station, based on a UL signal transmitted from the UE. The UL signal may be a given reference signal (for example, an SRS) or another signal.

The base station may indicate/configure/trigger transmission of the UL signal/RS (also referred to as an SRS below) for each UE before performing scheduling for the UE (for example, schedule of UE cooperative MIMO transmission/ schedule of UE-to-UE signal transmission). The base station may determine a TPMI/SRI of each UE, based on the received SRS.

Figures 18A, 18B:
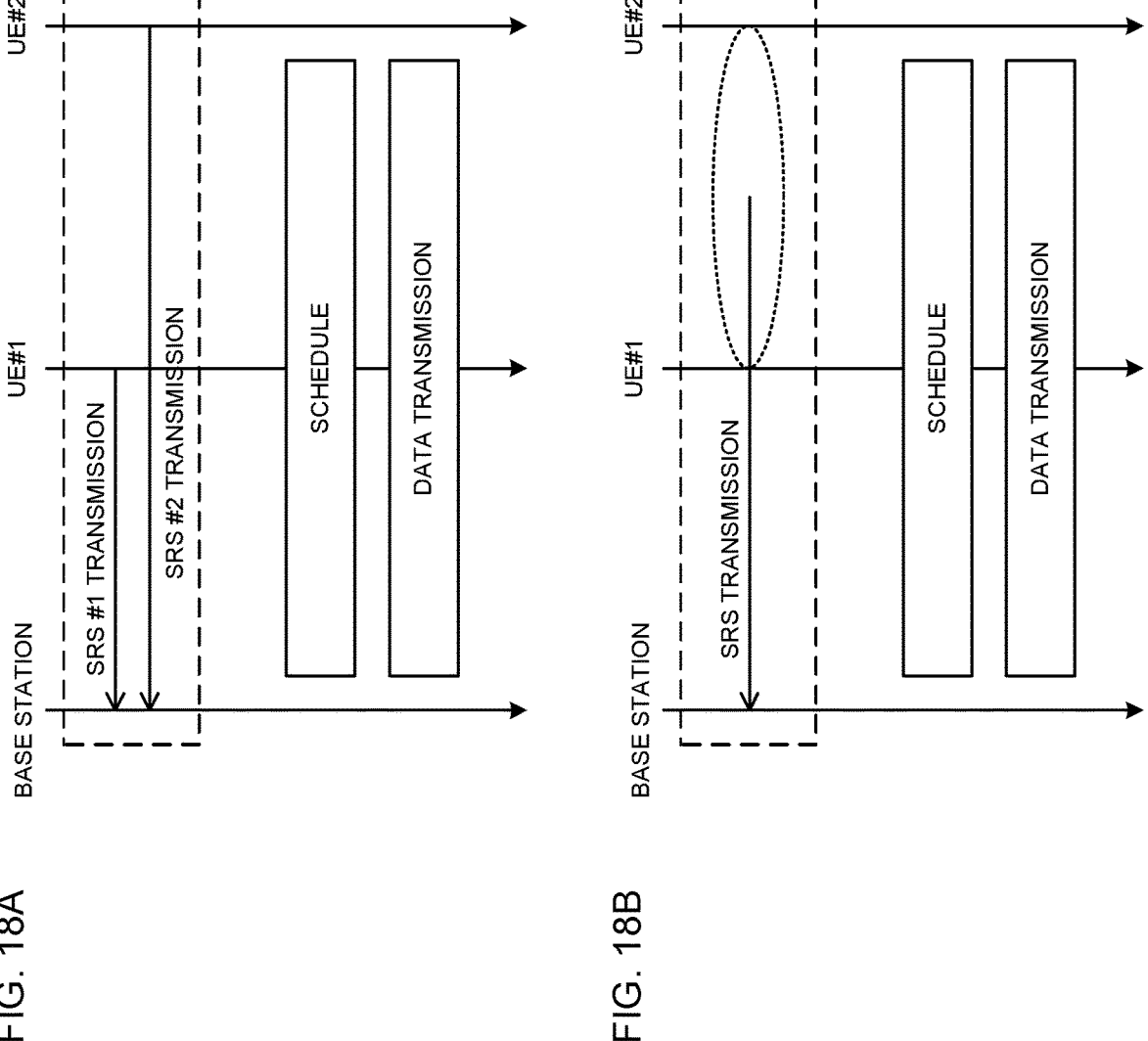
FIGS. 18A and 18B are diagrams to show an example of SRS transmission in UE cooperative MIMO according to a sixth embodiment.

For the transmission of the SRS, SRSs (here, SRS #1 and SRS #2) transmitted from the respective UEs (for example, UE #1 and UE #2) may use different SRS resources (refer to FIG. 18A). The base station may use higher layer signaling or the like for UE #1 and UE #2 to configure different SRS resources.

In this case, the UEs may be different in SRS transmission timing (for example, timing advance). In a case where transmission timings of SRSs transmitted from the respective UEs are different from each other, the base station may adjust timing advance, based on results of the reception of the SRSs. The UE may be controlled in terms of timing advance by the base station after the SRS transmission.

In a case where timing advance is adjusted based on the SRS, the UE may receive a timing advance command included in a MAC CE transmitted in a PDSCH (TA command in MAC CE), after the transmission of the SRS. In a case of receiving the timing advance command, the UE may adjust timing advance (or UL transmission timing), based on received information.

Alternatively, for the transmission of the SRS, the SRSs (here, SRS #1 and SRS #2) transmitted from the respective UEs (for example, UE #1 and UE #2) may use the same/ common SRS resource (refer to FIG. 18B). The base station may use higher layer signaling or the like for UE #1 and UE #2 to configure a common SRS resource. Each UE transmits an SRS by cooperatively using a single SRS resource.

In this case, the UEs needs to have the same SRS transmission timing (timing advance). Hence, such control that timing advance is adjusted based on UL transmission (for example, a PRACH/SRS/PUSCH/PUCCH or the like) before the SRS transmission may be performed.

Figure 19:
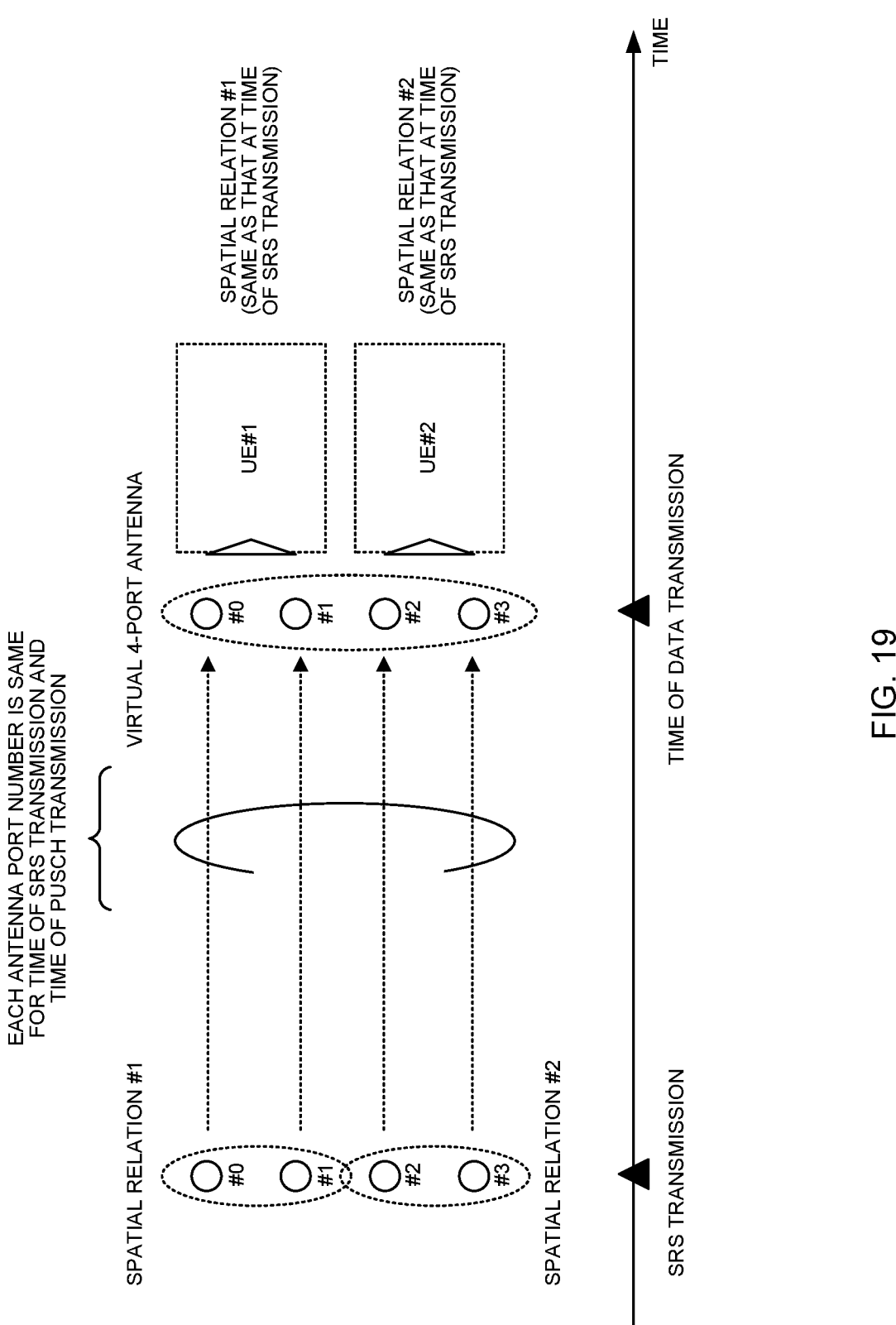
FIG. 19 is a diagram to show an example of SRS transmission and PUSCH transmission in UE cooperative MIMO according to the sixth embodiment.

The correspondence relationship of the antenna ports may be the same between the time of SRS transmission and the time of PUSCH transmission (for example, the time of UE cooperative PUSCH transmission) (refer to FIG. 19). For example, such a configuration that the antenna ports do not switch across the UEs at the time of SRS transmission and the time of PUSCH transmission may be used. Alternatively, such a configuration that UL beams (for example, SRI/ spatial relation) do not change at the time of SRS transmission and the time of PUSCH transmission may be used.

The UE may assume that beams of the antenna ports in PUSCH transmission (for example, the spatial relation/TCI state/quasi-co-location) are equal to those at the time of recent SRS transmission. FIG. 19 shows a case where the antenna ports (#0 and #1) and the spatial relation (#1) corresponding to UE #1 at the time of SRS transmission and the antenna ports (#0 and #1) and the spatial relation (#1) corresponding to UE #1 at the time of PUSCH transmission are equal to each other. Similarly, FIG. 19 shows a case where the antenna ports (#2 and #3) and the spatial relation (#2) corresponding to UE #2 at the time of SRS transmission and the antenna ports (#2 and #3) and the spatial relation (#2) corresponding to UE #2 at the time of PUSCH transmission are equal to each other.

Although PUSCH transmission is used as an example in FIG. 19, this is not restrictive. The same mechanism/rule may be also applied to transmission of another UL signal/UL channel (for example, a PUCCH) transmitted in a cooperative manner between the UEs.

In a case where one or more UEs (for example, the UEs to perform UE cooperative MIMO) transmit a UL signal/UL channel, a plurality of beams (for example, TCI states, spatial relations, or quasi-co-locations (QCLs)) may be configured in a single UL signal/UL channel (or a resource for a single UL signal/UL channel). The UL signal/UL channel may be interpreted as at least one of an SRS, a PUSCH, and a PUCCH.

Figure 20:
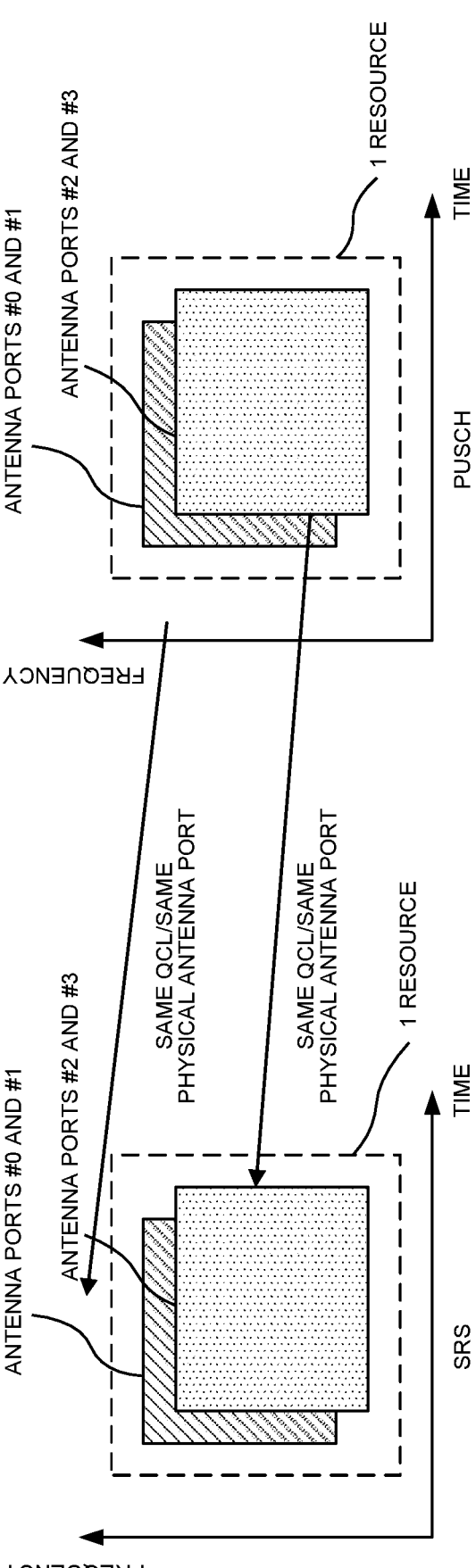
FIG. 20 is a diagram to show another example of the SRS transmission and the PUSCH transmission in UE cooperative MIMO according to the sixth embodiment.

In this case, a configuration that channels (or a signal and a channel) among an SRS/PUSCH/PUCCH may be mapped to the same physical antenna port for the same antenna port may be used (refer to FIG. 20). A configuration that the same beam (for example, TCI state, spatial relation, or quasi-co-location) corresponds to channels (or a signal and a channel) among an SRS/PUSCH/PUCCH for the same antenna port may be used.

In FIG. 20, the same numbers are used for antenna port numbers at the time of SRS transmission and antenna port numbers at the time of PUSCH transmission. The same beam (for example, TCI state, spatial relation, or quasi-co-location) may be configured for the antenna ports having the same number at the time of SRS transmission and at the time of PUSCH transmission. A plurality of TCI states (for example, TCI state #1 and TCI state #2) may be configured for a common SRS resource (for example, SRS resource #1).

A configuration that the phases are continuous between antenna ports #0 and #1 (coherent), the phases are continuous between antenna ports #2 and #3 (coherent), and the phases are not continuous between antenna ports #0 and #1 and antenna ports #2 and #3 (not coherent) may be used.

Figure 21:
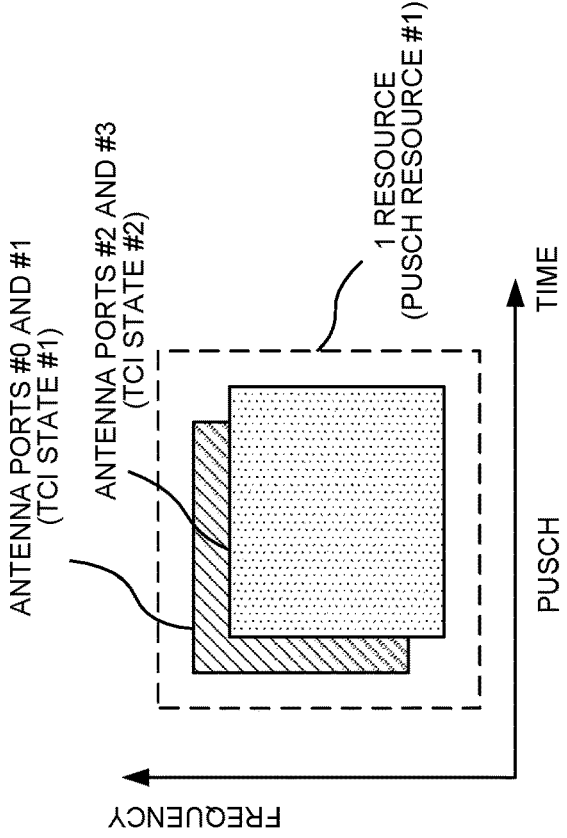
FIG. 21 is a diagram to show another example of the SRS transmission and the PUSCH transmission in UE cooperative MIMO according to the sixth embodiment.
Figure 21:
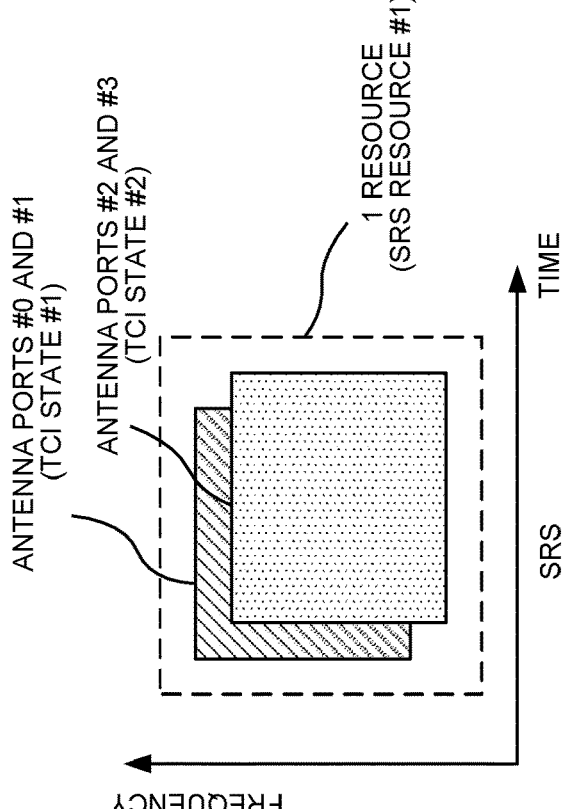

TCI states/spatial relations/QCLs may be configurable separately (for example, differently) for the respective antenna ports (refer to FIG. 21). FIG. 21 shows a case where TCI state #1 and TCI state #2 are configured for the common SRS resource (for example, SRS resource #1). In this case, the TCI states may be mapped to the respective antenna ports, based on a given rule. Here, a case where a TCI state ID having a small index is mapped/corresponds to a small antenna port number.

Specifically, TCI state #1 is configured for antenna ports #0 and #1 of SRS resource #1, and TCI state #2 is configured for antenna ports #2 and #3 of SRS resource #1. FIG. 21 also shows a case where the same association between the antenna ports and the TCI states is also used in a different UL signal/UL channel transmission (for example, PUSCH transmission). Specifically, TCI state #1 is configured for antenna ports #0 and #1 of PUSCH resource #1, and TCI state #2 is configured for antenna ports #2 and #3 of PUSCH resource #1.

<Variations>

FIG. 21 shows the case where a plurality of beams (for example, spatial relations/TCI states/quasi-co-locations) are configured for a single UL signal/UL channel. However, this is not restrictive. A single beam (for example, spatial relation/TCI state/quasi-co-location) may be configured for each UL signal/UL channel (refer to FIG. 22). In other words, TCI states/spatial relations/QCLs may be configurable separately (for example, differently) for the respective resources.

Figure 22:
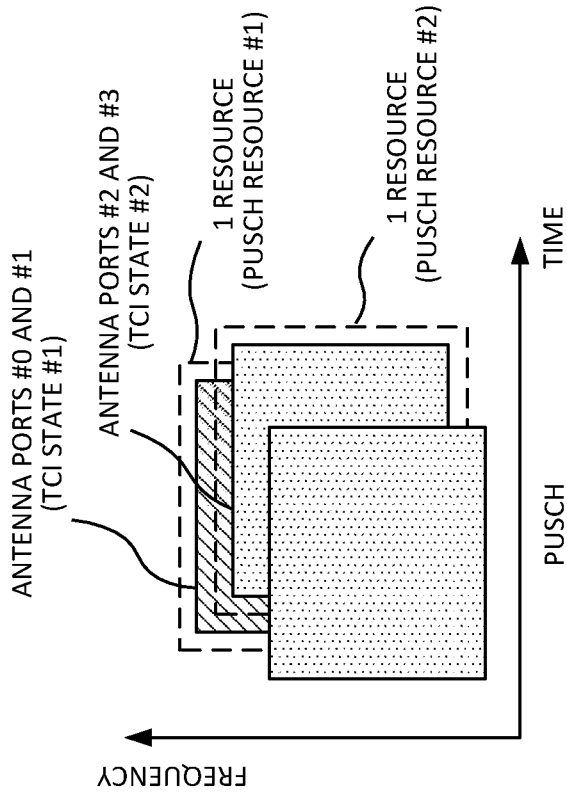
FIG. 22 is a diagram to show another example of the SRS transmission and the PUSCH transmission in UE cooperative MIMO according to the sixth embodiment.
Figure 22:
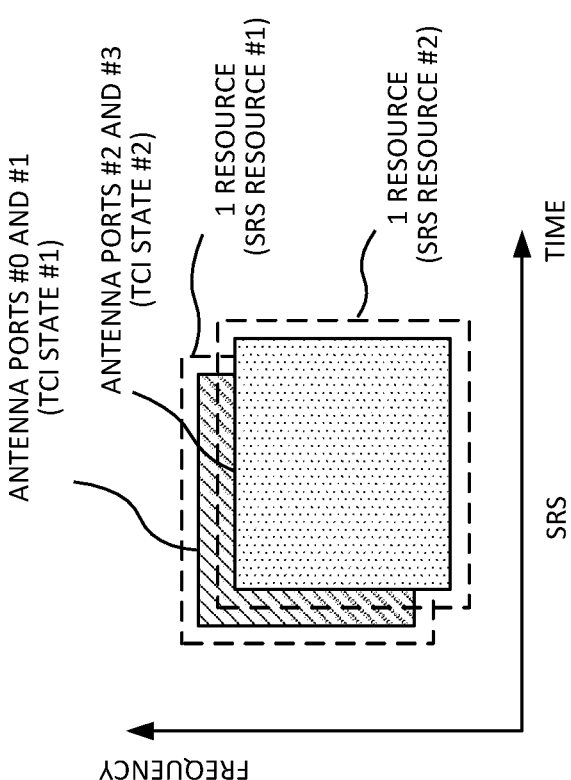

FIG. 22 shows a case where TCI state #1 is configured for SRS resource #1 (or antenna ports #0 and #1 corresponding to SRS resource #1), and TCI state #2 is configured for SRS resource #2 (or antenna ports #2 and #3 corresponding to SRS resource #2).

The same association between the antenna ports and the TCI states may also be used in a different UL signal/UL channel transmission (for example, PUSCH transmission). For example, TCI state #1 is configured for PUSCH resource #1 (or antenna ports #0 and #1 corresponding to PUSCH resource #1), and TCI state #2 is configured for PUSCH resource #2 (or antenna ports #2 and #3 corresponding to PUSCH resource #2).

Seventh Embodiment

In a case of performing communication by using UE cooperative MIMO, when an error has occurred in transmission of data (for example, in a unit of TB/CW/CB) transmitted from each UE (for example, when an error is detected by the base station), given retransmission control may be performed. The base station may give a retransmission indication to a corresponding one of the UEs, based on CRC check or error checking code.

For example, the UE may perform retransmission control, based on at least one of Aspects 7-1 and 7-2. The following description uses a case of dividing transmission data (or UL data) in a unit of CB, as an example. However, this is not restrictive.

<Aspect 7-1>

Figure 23:
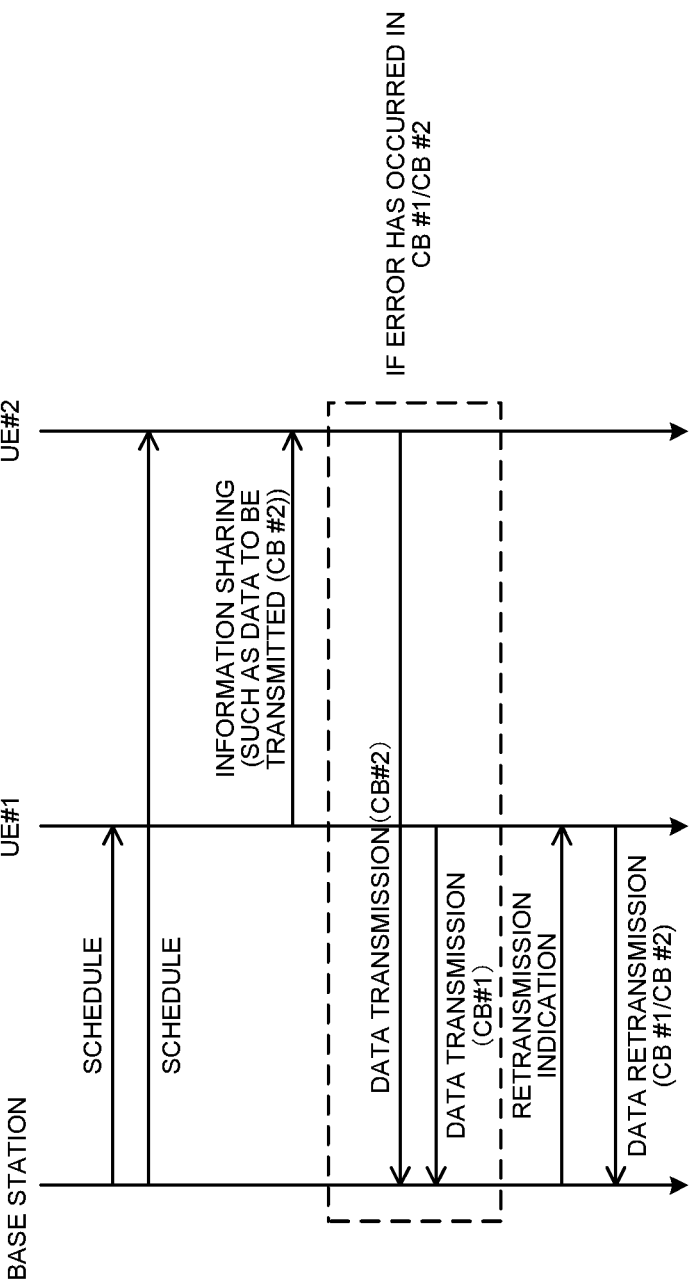
FIG. 23 is a diagram to show an example of retransmission control in UE cooperative MIMO according to a seventh embodiment.

Such control that the data transmission source UE (for example, UE #1) retransmits UL data irrespective of which UL data has an error (or which UE has transmitted the UL data) may be performed (refer to FIG. 23). FIG. 23 shows a case where CB #1 of UL data of UE #1 (for example, CB #1+CB #2) is transmitted from UE #1 (or the antenna ports of UE #1) and CB #2 of the UL data is transmitted from UE #2 (or the antenna ports of UE #2).

When an error has occurred in transmission of at least one of CB #1 and CB #2, UE #1 may perform such control as to perform retransmission of the CB from UE #1. In this case, UE #1 may perform such control as to retransmit only the erroneous CB or retransmit the CBs including the CB that is not erroneous.

The resource to be used for the retransmission may be a resource (for example, a resource for retransmission) different from the resource scheduled for the UL data transmission. The resource for retransmission may be defined in a specification or may be configured for the UE by the base station through higher layer signaling or the like. When the UE receives information related to a retransmission indication (or information related to an error) from the base station, the UE may transmit a PUSCH for retransmission by using a given resource.

When an error is detected in at least one of CB #1 transmitted from UE #1 and CB #2 transmitted from UE #2, the base station may notify UE #1 (or UE #1 and UE #2) of the information related to a retransmission indication. In this case, such control as to perform retransmission by UE #1 may be performed.

By performing such control that the transmission source or data transfer source UE (UE #1) performs retransmission as described above, it is possible not to require new UE-to-UE transfer for retransmission even when an error is detected in a CB not transferred to another UE.

<Aspect 7-2>

The UE to perform retransmission may be determined/selected based on which UL data has an error (which UE has transmitted the UL data).

<<Option A>>

The UE notified of an indication of retransmission of a CB transmitted at the initial transmission (or that the CB is erroneous) by the base station (or the UE that has made an error in the transmission) may perform such control as to retransmit the CB.

The base station may schedule a PUSCH resource for transmitting data for the retransmission, for the UE. The UE may transmit the UL data for which retransmission using the resource scheduled by the base station is indicated. Note that the UE may perform such control as to retransmit only the erroneous CB or retransmit the CBs including the CB that is not erroneous.

The resource to be used for the retransmission may be a resource (for example, a resource for retransmission) different from the resource scheduled for the UL data transmission. The resource for retransmission may be defined in a specification or may be configured for the UE by the base station through higher layer signaling or the like. When the UE receives information related to a retransmission indication (or information related to an error) from the base station, the UE may transmit a PUSCH for retransmission by using a given resource.

The base station may notify the transmission source UE of the UL data, of an indication of retransmission of the UL data. For example, when an error is detected in CB #1 transmitted from UE #1, the base station may notify UE #1 of information related to the retransmission indication. When an error is detected in CB #2 transmitted from UE #2, the base station may notify UE #2 of the information related to the retransmission indication. By the UE having made an error in transmission of UL data performing retransmission as described above, it is possible not to require new UE-to-UE transfer for the retransmission.

Note that, when an error is detected in any one of CBs (for example, CB #2 transmitted from UE #2), the base station may notify both of the UEs (for example, UE #1 and UE #2) of information related to a retransmission indication. In this case, only UE #2 may perform retransmission, or such control that both UE #1 and UE #2 perform retransmission may be performed.

<<Option B>>

The UE notified of an indication of retransmission of a CB transmitted at the initial transmission (or that the CB is erroneous) by the base station (or the UE that has made an error in the transmission) may perform such control as not to retransmit the CB (that another UE transmits the erroneous CB).

Figure 24:
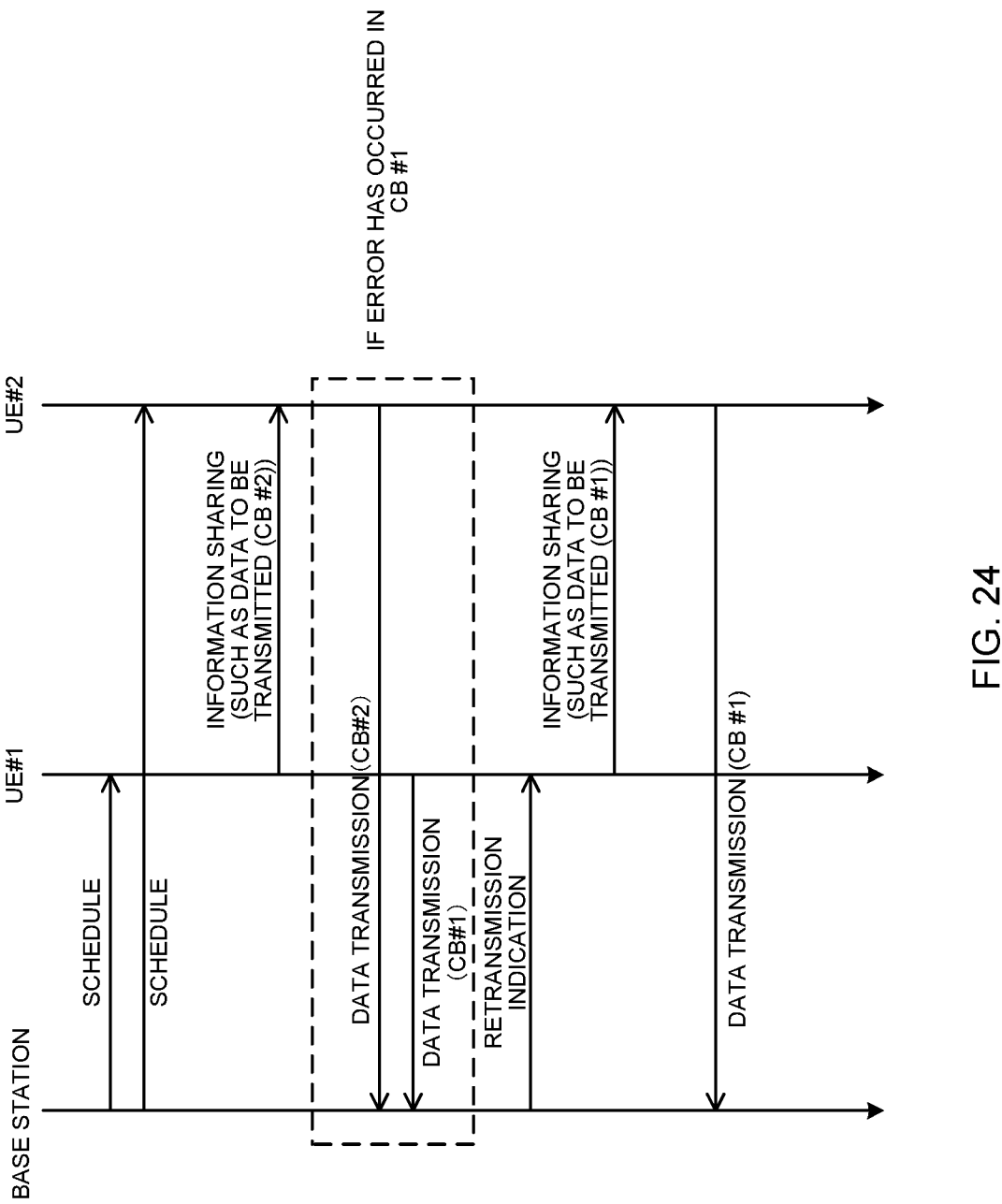
FIG. 24 is a diagram to show another example of the retransmission control in UE cooperative MIMO according to the seventh embodiment.

For example, when an error is detected in CB #1 transmitted from UE #1, such control that UE #2 retransmits CB #1 may be performed (refer to FIG. 24). In this case, UE #1 may transfer/information-share CB #1 to/with UE #2, and UE #2 may transmit CB #1 to the base station. The base station may notify UE #1 of information related to a retransmission indication or may notify both UE #1 and UE #2 of the information related to the retransmission indication. The embodiments described above (for example, the fifth embodiment) may be applied to control of transfer from UE #1 to UE #2.

When an error is detected in CB #2 transmitted from UE #2, such control that UE #1 retransmits CB #2 may be performed. In this case, since UE #1 already knows information of CB #2, UE-to-UE transfer is not required. The base station may notify UE #1 of information related to a retransmission indication or may notify both UE #1 and UE #2 of the information related to the retransmission indication.

By the UE different from the UE that has made an error in transmission performing retransmission as described above, it is possible to perform retransmission from a UE having a better communication environment.

Note that when an error is detected in each of CBs from both of the UEs, such control that a given one of the UEs (for example, UE #1) performs retransmission or that each of the UEs performs retransmission may be performed.

(Supplements)

The embodiments described above may be applied only to a UE that has reported support through UE capability signaling (for example, UE capability signaling). In addition, in the embodiments described above, the configuration that part of data of UE #1 is also transmitted from UE #2. However, by using this configuration as a basis, whether or not data transfer from UE #2 to U ##1 (or the availability of bidirectional data transfer) can be supported may be reported through another UE capability signaling.

It may be configured that each of the embodiments described above is applied to a case of being configured by the base station by using a higher layer control signal or the like. In the embodiments described above, UE #1 and UE #2 may be interpreted as a first UE and a second UE, a master UE and a slave UE, or a primary UE and a secondary UE.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 25:
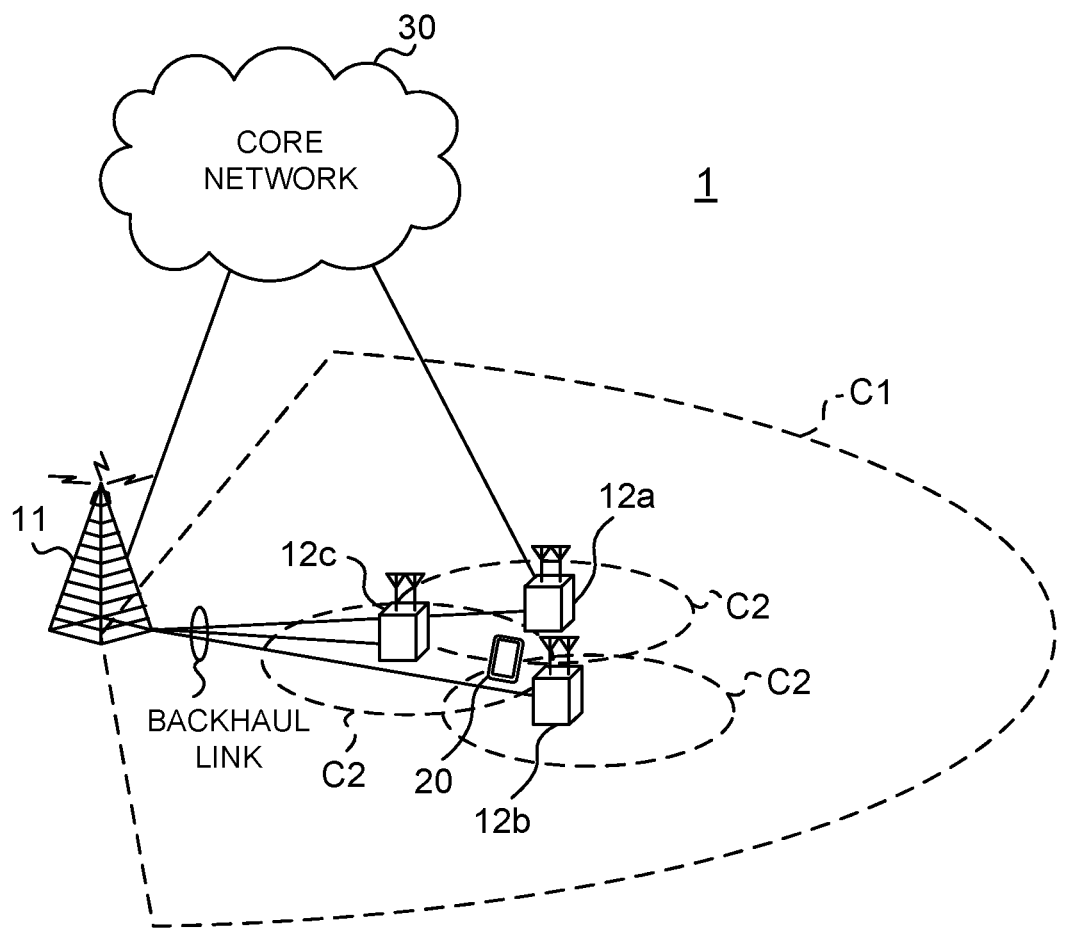
FIG. 25 is a diagram to show an example of a schematic structure of a radio communication system according to one embodiment.

FIG. 25 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 26:
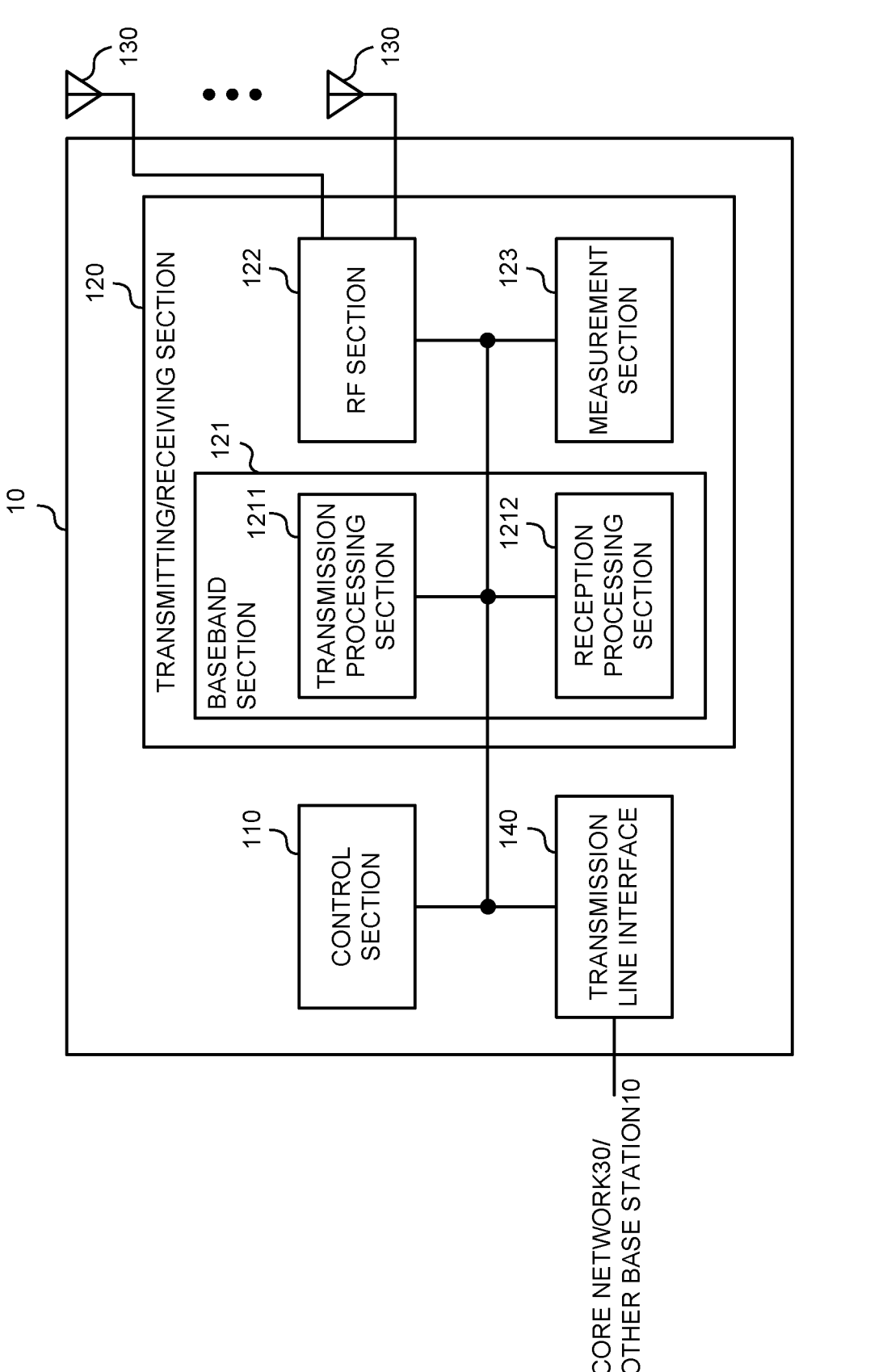
FIG. 26 is a diagram to show an example of a structure of a base station according to one embodiment.

FIG. 26 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit information related to schedule to at least one of a plurality of terminals. The control section 110 may control reception of UL data cooperatively transmitted from the plurality of terminals, based on the information related to the schedule.

The transmitting/receiving section 120 may transmit the information related to the schedule to at least one of the plurality of terminals by using terminal-specific downlink control information or group-common downlink control information. The control section 110 may control reception of UL data cooperatively transmitted from the plurality of terminals, based on the information related to the schedule.

The transmitting/receiving section 120 may receive the UL data cooperatively transmitted from the plurality of terminals, based on the information related to the schedule transmitted to at least one of the plurality of terminals. The control section 110 may configure a resource or a resource pool to be used for transmission of information related to part of the UL data, the part of the UL data being obtained by dividing the UL data in at least one of a unit of transport block, a unit of codeword, a unit of code block, and a unit of bit.

The transmitting/receiving section 120 may receive sounding reference signals from the plurality of terminals. The control section 110 may control reception of UL transmission cooperatively transmitted from the plurality of terminals, based on the information related to the schedule. The antenna port to be used for transmission of the sounding reference signal and the antenna port to be used for the UL transmission may be associated with each other.

(User Terminal)

Figure 27:
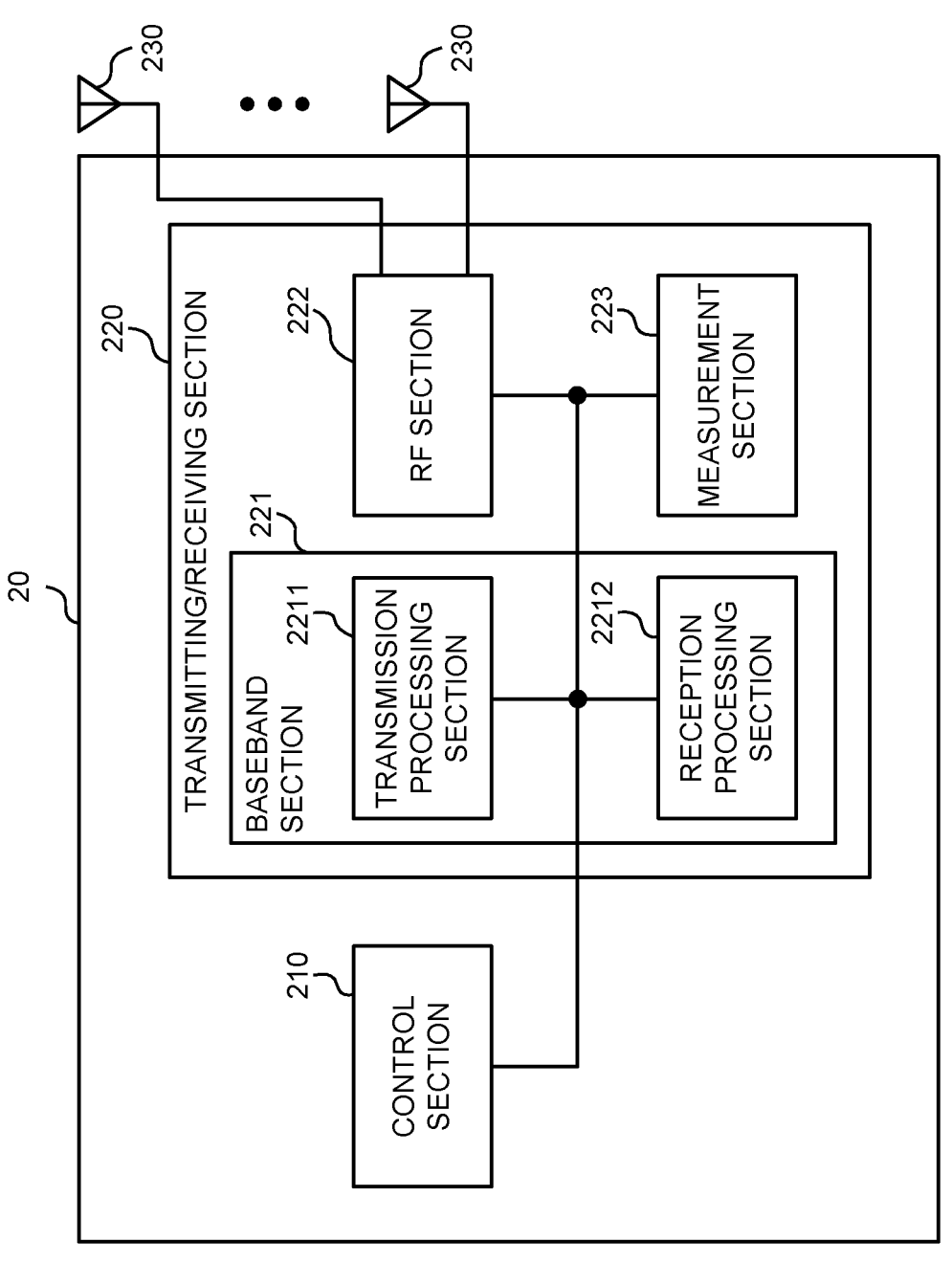
FIG. 27 is a diagram to show an example of a structure of a user terminal according to one embodiment.

FIG. 27 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive information related to schedule. The transmitting/receiving section 220 may transmit information related to at least part of UL data to another terminal. The transmitting/receiving section 220 may receive a synchronization signal used for synchronization with another terminal. The control section 110 may perform such control as to transmit the UL data in cooperation with another terminal, based on the information related to the schedule. The UL data may be transmitted by using the number of ranks or layers greater than the number of antenna ports supported by at least one of the terminal and another terminal. In cooperative transmission of the UL data, at least part of parameters may be configured in common for a first demodulation reference signal corresponding to first UL data transmitted by the terminal and a second demodulation reference signal corresponding to second UL data transmitted by another terminal.

The transmitting/receiving section 220 may receive the information related to the schedule by using terminal-specific downlink control information or group-common downlink control information. The control section 110 may perform such control as to transmit the UL data in cooperation with another terminal, based on the information related to the schedule. The terminal-specific downlink control information may include information related to schedule for the terminal and another terminal. The terminal-specific downlink control information or the group-common downlink control information may include at least one of first parameter information to be used for transmission of information related to at least part of UL data and second parameter information to be used for transmission of the UL data. The transmitting/receiving section 220 may receive the first parameter information to be used for transmission of information related to at least part of the UL data and the second parameter information to be used for transmission of the UL data, by using different pieces of downlink control information.

The transmitting/receiving section 220 may transmit, to another terminal, information related to part of the UL data, the part of the UL data being obtained by dividing the UL data in at least one of a unit of transport block, a unit of codeword, a unit of code block, and a unit of bit. The control section 110 may perform such control as to transmit the UL data in cooperation with another terminal, based on the information related to the schedule. The transmitting/receiving section 220 may transmit the information related to the part of UL data to another terminal by using a higher layer. The transmitting/receiving section 220 may transmit the information related to the part of UL data to another terminal by using a channel used for device-to-device communication (D2D) and a channel for sidelink. The transmitting/receiving section 220 may transmit the information related to the part of UL data by using any of the resources included in a resource pool or a scheduled resource.

The transmitting/receiving section 220 may transmit a sounding reference signal. The transmitting/receiving section 220 may receive information related to schedule. The control section 110 may perform such control as to perform UL transmission in cooperation with another terminal, based on the information related to the schedule. The antenna ports to be used for transmission of the sounding reference signals and the antenna ports to be used for the UL transmission may be associated with each other. At least one of a different quasi-co-location, a different transmission configuration index, and a different spatial relation may be configured for each antenna port number. In transmission of a sounding reference signal and UL transmission, at least one of the same quasi-co-location, the same transmission configuration index, and the same spatial relation may be configured for identical antenna port numbers.

In a case of retransmitting UL transmission transmitted in cooperation with another terminal, the control section 110 may perform such control as to perform retransmission from a given terminal.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 28:
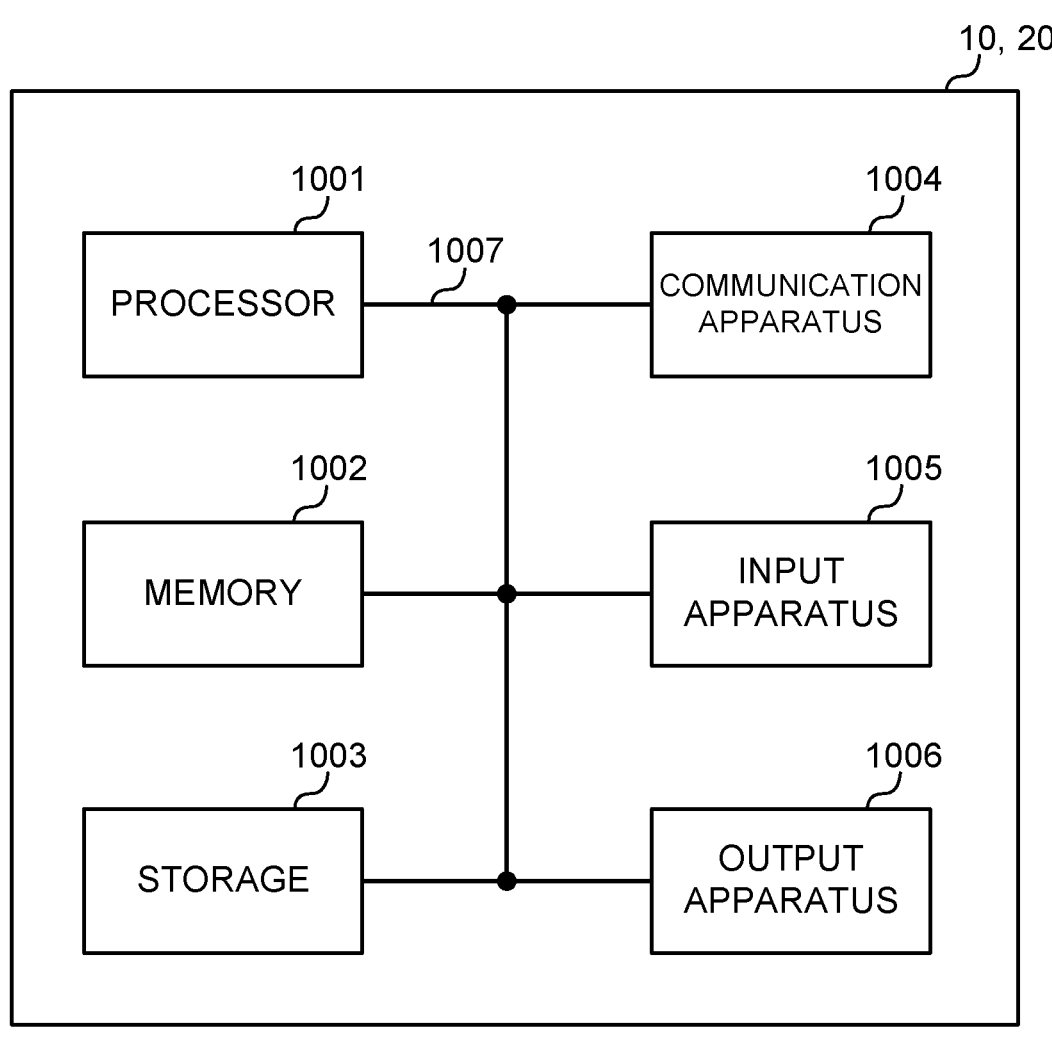
FIG. 28 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 28 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EE-PROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB,"

an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink," "downlink," and the like may be interpreted as the words corresponding to the terminal-to-terminal communication (for example, "sidelink"). For example, an uplink channel, a downlink channel, and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a receiving section that receives information related to schedule of uplink (UL) data;
a transmitting section that transmits, to another terminal, the UL data and information related to part of the UL data, the part of the UL data being obtained by dividing the UL data in at least one of a unit of transport block, a unit of codeword and a unit of bit; and
a control section that performs control to transmit the UL data scheduled by the information related to the schedule in cooperation with the another terminal, by transmitting to the base station the UL data not transmitted from the another terminal, wherein the information related to the part of the UL data includes control information and channel state information related to the UL data, and wherein a first demodulation reference signal corresponding to first UL data transmitted by the terminal and a second demodulation reference signal corresponding to second UL data transmitted by the another terminal are configured at least one parameter in common.

2. The terminal according to claim 1, wherein the transmitting section transmits the part of the UL data and the information related to the part of the UL data to the another terminal by using a higher layer.

3. The terminal according to claim 1, wherein the transmitting section transmits the part of the UL data and the information related to the part of the UL data to the another terminal by using a channel used for device-to-device communication and a channel for sidelink.

4. The terminal according to claim 3, wherein the transmitting section transmits the part of the UL data and the information related to the part of the UL data by using any resource included in a resource pool or a scheduled resource.

5. A radio communication method of a terminal, the radio communication method comprising:

receiving information related to schedule of uplink (UL) data;

transmitting, to another terminal, the UL data and information related to part of the UL data, the part of the UL data being obtained by dividing the UL data in at least one of a unit of transport block, a unit of codeword and a unit of bit; and performing control to transmit the UL data scheduled by the information related to the schedule in cooperation with the another terminal, by transmitting to the base station the UL data not transmitted from the another terminal, wherein the information related to the part of the UL data includes control information and channel state information related to the UL data, and wherein a first demodulation reference signal corresponding to first UL data transmitted by the terminal and a second demodulation reference signal corresponding to second UL data transmitted by the another terminal are configured at least one parameter in common.

6. A base station comprising:

a transmitting section that transmits information related to schedule of uplink (UL) data to a first terminal;

a control section that configures a resource or a resource pool to be used for transmission of the UL data and information related to part of the UL data, the part of the UL data being obtained by dividing the UL data in at least one of a unit of transport block, a unit of codeword and a unit of bit; and a receiving section that receives the UL data, scheduled by the information related to the schedule, cooperatively transmitted from the first terminal and a second terminal, by reception from the first terminal the UL data not transmitted from the second terminal, wherein the information related to the part of the UL data includes control information and channel state information related to the UL data, and wherein a first demodulation reference signal corresponding to first UL data transmitted by the first terminal and a second demodulation reference signal corresponding to second UL data transmitted by the second terminal are configured at least one parameter in common.

* * * * *